United States Patent
Cho et al.

(10) Patent No.: US 10,008,198 B2
(45) Date of Patent: Jun. 26, 2018

(54) NESTED SEGMENTATION METHOD FOR SPEECH RECOGNITION BASED ON SOUND PROCESSING OF BRAIN

(71) Applicant: KOREA ADVANCED INSTITUTE OF SCIENCE AND TECHNOLOGY, Daejeon (KR)

(72) Inventors: Kwang-Hyun Cho, Daejeon (KR); Byeongwook Lee, Chungcheongbuk-do (KR); Sung Hoon Jung, Gyeonggi-do (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 59 days.

(21) Appl. No.: 14/143,068

(22) Filed: Dec. 30, 2013

(65) Prior Publication Data

US 2014/0297274 A1 Oct. 2, 2014

(30) Foreign Application Priority Data

Mar. 28, 2013 (KR) .................. 10-2013-0033841
Mar. 28, 2013 (KR) .................. 10-2013-0033845
Jul. 18, 2013 (KR) .................. 10-2013-0085016

(51) Int. Cl.

| G10L 15/00 | (2013.01) |
|---|---|
| G10L 21/00 | (2013.01) |
| G10L 17/00 | (2013.01) |
| G10L 21/02 | (2013.01) |
| G06F 17/30 | (2006.01) |
| G10L 15/04 | (2013.01) |

(52) U.S. Cl.
CPC .................. *G10L 15/04* (2013.01)

(58) Field of Classification Search
CPC ......... G10L 15/00; G10L 21/00; G10L 17/00; G10L 21/02; G06F 17/30
USPC ............... 704/207, 209, 226, 246, 500, 231
See application file for complete search history.

(56) References Cited

U.S. PATENT DOCUMENTS

| 4,375,304 A | 2/1983 | Flanagan |
| 4,885,790 A * | 12/1989 | McAulay ............... G10L 19/02 704/261 |
| 5,765,127 A * | 6/1998 | Nishiguchi ......... G10L 19/0212 704/208 |

(Continued)

FOREIGN PATENT DOCUMENTS

| KR | 1020080077720 A | 8/2008 |
| KR | 1020090016343 A | 2/2009 |
| KR | 101434592 B1 | 8/2014 |

OTHER PUBLICATIONS

Saratxaga et al., ("Simple representation of signal phase for harmonic speech models", Electronic Letters, Mar. 2009.*

(Continued)

*Primary Examiner* — Seong Ah A Shin
(74) *Attorney, Agent, or Firm* — Ladas & Parry LLP

(57) ABSTRACT

A method of segmenting input speech signal into plurality of frames for speech recognition is disclosed. The method includes extracting a low frequency signal from the speech signal, and segmenting the speech signal into a plurality of time-intervals according to a plurality of instantaneous phase-sections of the low frequency signal.

18 Claims, 17 Drawing Sheets

(56) References Cited

U.S. PATENT DOCUMENTS

| | | | | |
|---|---|---|---|---|
| 6,188,979 | B1* | 2/2001 | Ashley | G10L 25/90 704/205 |
| 6,219,635 | B1* | 4/2001 | Coulter | G10L 25/90 704/207 |
| 7,072,831 | B1* | 7/2006 | Etter | G10L 25/48 704/215 |
| 8,412,525 | B2* | 4/2013 | Mukerjee | G10L 15/142 704/233 |
| 8,566,092 | B2* | 10/2013 | Liu | G10L 17/02 704/206 |
| 2002/0116178 | A1* | 8/2002 | Crockett | G10L 21/045 704/200.1 |
| 2005/0073986 | A1* | 4/2005 | Kondo | G10L 21/038 370/343 |
| 2011/0264447 | A1* | 10/2011 | Visser | G10L 25/78 704/208 |
| 2011/0270616 | A1* | 11/2011 | Garudadri | G10L 19/02 704/500 |
| 2014/0309992 | A1* | 10/2014 | Carney | G10L 25/15 704/209 |
| 2015/0112687 | A1* | 4/2015 | Bredikhin | G10L 21/003 704/260 |
| 2016/0148620 | A1* | 5/2016 | Bilobrov | G10L 25/54 704/270 |

OTHER PUBLICATIONS

Carney, Laurel H. "A model for the responses of low-frequency auditory-nerve fibers in cat." The Journal of the Acoustical Society of America 93.1 (1993): 401-417.*

Anderson ("Speech Analysis and Coding using a Multi-Resolution Sinusoidal Transform", ICASSP, May 1996).*

Maragos et al., ("Energy Separation in Signal Modulations with Application to Speech Analysis", IEEE, 1993, pp. 3024-pp. 3051).*

Deshmukh et al., ("Speech enhancement using the modified phase-opponency model", J. Acoust. Sco. Am. Jun. 2007, pp. 3886-pp. 3898.*

Quatieri et al., "Shape invariant time-scale and pitch modification of speech." IEEE Transactions on Signal Processing 40.3 (1992): 497-510.*

Panagiotakis et al., "A speech/music discriminator based on RMS and zero-crossings." IEEE Transactions on multimedia 7.1 (2005): 155-166.*

* cited by examiner

FIG. 10
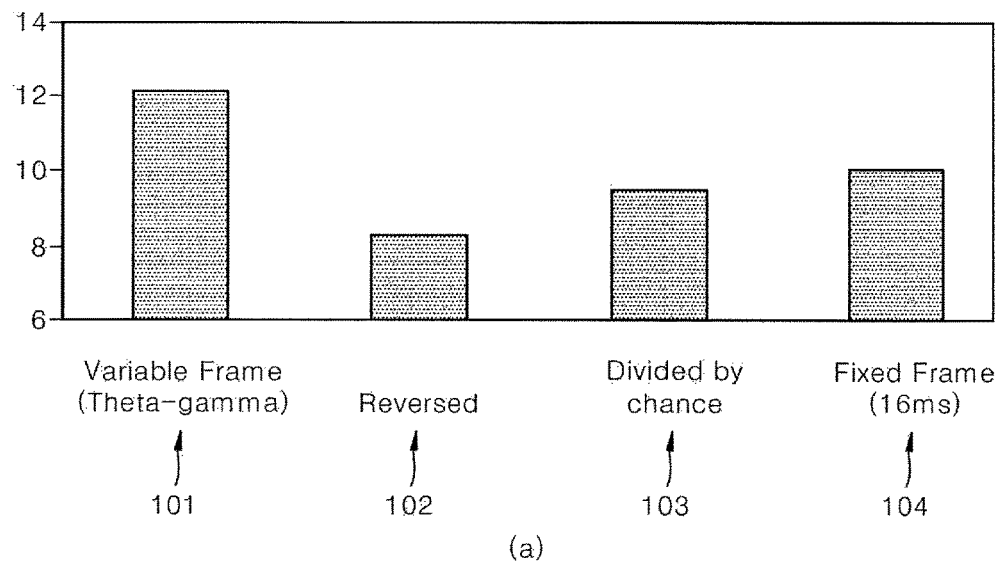
(a)
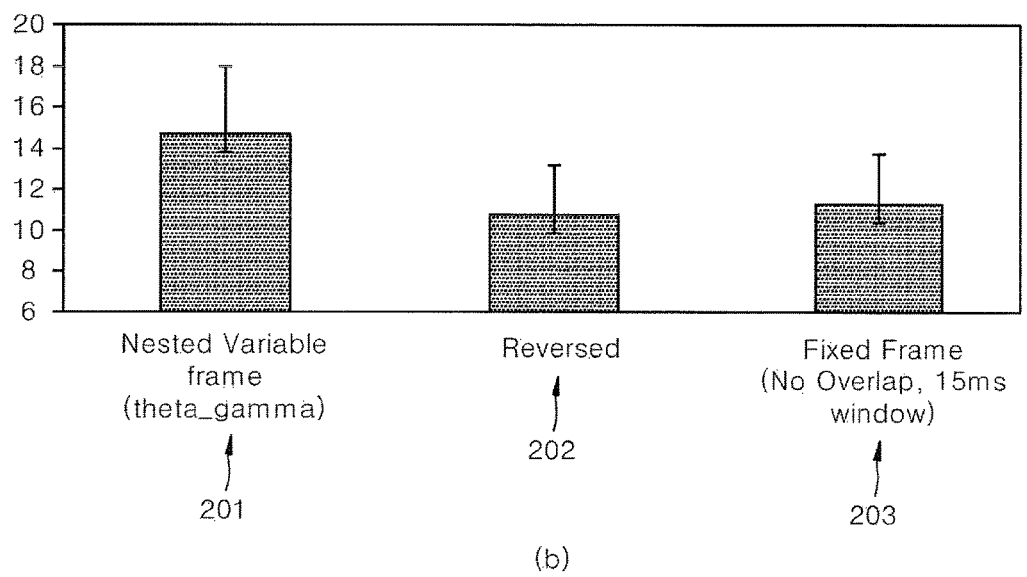
(b)

FIG. 14

| Consonant | Fixed segmenting | Variable Segmenting | Consonant | Fixed segmenting | Variable Segmenting |
|---|---|---|---|---|---|
| p | 15 | 10 | b | 26 | 26 |
|   | 24 | 20 |   | 12 | 10 |
|   | 25 | 23 |   | 24 | 20 |
|   | 17 | 9 |   | 15 | 9 |
|   | 19 | 12 |   | 24 | 22 |
|   | 21 | 12 |   | 19 | 10 |
|   | 23 | 14 |   | 10 | 7 |
|   | .. | .. |   | .. | .. |
| t | 30 | 21 | d | 18 | 12 |
|   | 18 | 12 |   | 21 | 12 |
|   | 15 | 9 |   | 9 | 8 |
|   | 17 | 9 |   | 11 | 9 |
|   | 16 | 12 |   | 24 | 19 |
|   | 14 | 10 |   | 27 | 21 |
|   | 33 | 21 |   | 19 | 12 |
|   | .. | .. |   | .. | .. |
| k | 23 | 14 | g | 20 | 15 |
|   | 25 | 12 |   | 27 | 16 |
|   | 33 | 15 |   | 15 | 9 |
|   | 22 | 20 |   | 16 | 9 |
|   | 17 | 14 |   | 24 | 17 |
|   | 20 | 15 |   | .. | .. |
|   | 22 | 14 |   |   |   |
|   | .. | .. |   |   |   | of Frame number

NESTED SEGMENTATION METHOD FOR SPEECH RECOGNITION BASED ON SOUND PROCESSING OF BRAIN

CROSS-REFERENCE TO RELATED APPLICATION

This application claims priority to Korean Patent Application No. 10-2013-0085016 filed on Jul. 18, 2013, Korean Patent Application No. 10-2013-0033845 filed on Mar. 28, 2013, and Korean Patent Application No. 10-2013-0033841 filed on Mar. 28, 2013, and all the benefits accruing therefrom under 35 U.S.C. § 119, the contents of which are incorporated by reference in their entirety.

STATEMENT REGARDING GOVERNMENT FUNDED RESEARCH

This invention was supported by the National Research Foundation of Korea (NRF) grants funded by the Korea Government, the Ministry of Science, ICT & Future Planning (2015M3A9A7067220, 2014R1A2A1A10052404, and 2013M3A9A7046303).

BACKGROUND

The present disclosure relates to a speech signal processing technology, and more particularly, to a technology to segment a speech signal into a plurality of time frames.

Various technologies using computing devices for processing speech signals have been developed. The previous speech signal segmentation technologies for extracting speech signal features have not considered quasi-regular structure of speech signal. Most commonly used speech segmentation technique in state-of-the-art automatic speech recognition(ASR) system is fixed frame size and rate(FFSR) technique; segments the speech at typical size of 30 ms frame as the frame shifts aside in 10 ms order. The technique using the FFSR extract features equally without considering signal properties. That is, they extract features while shifting a frame having a length of 30 ms, by 10 ms. That is, the sizes of used frames are fixed to specific values irrespective of the types of speech signals. The method is effective in recognizing vowel of which a maintenance time is long and which has a periodic property, but is not effective in recognizing consonant of which the maintenance time is short and which has a non-periodic attribute. The segmented speech signal is further analyzed by feature extraction technique such as Mel-Frequency Cepstral Coefficient(MFCC). The MFCC technique extracts all frequency components of speech signal through a Fast Fourier Transform(FFT) and further process frequency information non-linearly to be represented as 13 feature vectors. According to the technique (i.e. MFCC), when noise is added to speech signal, even frequency components of noise are included in the feature vectors and features unique to speech signals are not well represented. As a result, serious degradation of speech recognition accuracy is caused by conventional speech processing techniques (i.e. FFSR, MFCC).

On the one hand, if a neural signal measured from auditory cortex is high-frequency pass filtered, a spike signal is extracted. On the other hand, when a signal is low pass filtered and a component having a band lower than or equal to 300 Hz is extracted, a signal called local field potential (LFP) may be obtained. The LFP above may be considered as a signal that does not contribute to the generation of the spike signal.

The phase components of the low frequency components of the neural signal of the auditory cortex generated while hearing and then recognizing speech signals may have 1) a parsing function that divides the speech signals into decodable units, and 2) an independent information unit function that provides one piece of information by themselves.

SUMMARY

The present disclosure provides a novel technology relating to a method of dividing a speech signal into a plurality of frames for speech recognition. The present disclosure also provides a method of unequally dividing consonant and vowel into frames having different lengths.

Whereas a typical speech signal processing technique uses frames having a certain length as a basic unit for processing speech signals, human brain uses a unit of a phoneme in order to recognize speech. It has not been clearly defined how a human identifies a phoneme, but it may be assumed that the spike signals generated from auditory cortex are used as a unit for recognizing speech and that LFP components not contributing to generating the spike signals become temporal reference that groups and identifies spikes by time in order to extract maximum information from speech signals.

It has been revealed through an experiment that while a human hears speech signals, the low frequency component (low frequency component time signal) of a speech signal envelope and the low frequency component of neural oscillation flowing on the auditory cortex of brain are phase locked. That is, it may be said that the low frequency component of neural oscillation generated while hearing and recognizing the speech signal is similar to the low frequency signal of the speech signal envelope. Thus, in an aspect of the present invention, the frame of the speech signal is defined by using the low frequency signal of the speech signal envelope.

By performing Hilbert transform on the low frequency signal (similar to LFP) of the speech signal, it is possible to extract instantaneous phase information having a value of $-\pi$ to $\pi$. In addition, values that the instantaneous phase may have are divided into a plurality of phase-sections and each speech signal time-interval corresponding to each phase-section is defined as a frame. For example, the phase-section from $-\pi$ to $\pi$ may be divided into four phase-sections [$-\pi$ to $-0.5*\pi$], [$-0.5*\pi$ to 0], [0 to $0.5*\pi$], and [$0.5*\pi$ to $\pi$] and a speech signal time-interval corresponding to each phase-section among the LFP signal may be defined as an independent frame. When the four phase-sections are defined, one or four or more speech signal time-intervals may be generated. When such a technique is used, the length of a defined frame varies. If the length of the frame varies in this way, it may be seen that an amount of information increases compared to when the speech signal is segmented into fixed frame sizes as before and that a signal shows a property more robust to noise. Also, when a fixed frame length of 30 ms is used, a typical technology in which a frame shifts by 10 ms has a 20 ms overlapping time-interval between frames but according to the present invention, it is possible to decrease the length of such an overlapping time-interval.

The low frequency component of a speech signal is phase locked to the low frequency component of LFP. Accordingly, it may be inferred that a factor causing the low frequency component of LFP measured from an auditory cortex is the low frequency component of the speech signal. That is, it may be estimated that the phase component of the low frequency component of the speech signal is phased locked to the LFP of the auditory cortex that is temporal reference. Thus, according to a view of the present invention, a method of determining the length of a frame by extracting the low frequency component of the speech signal and finding instantaneous phase information therefrom instead of using the LFP is used. This has a difference that the length and number of frames may be determined adaptively according to the speech signal, as compared to a typical technique of applying a fixed frame length of 30 ms to all the speech signals. Also, it is possible to effectively extract a transition time between phonemes and obtain corresponding information.

A Speech signal segmentation method according to an aspect of the present invention relates to a method of dividing frames of the speech signal input for speech recognition and includes extracting a low frequency signal of the speech signal; and segmenting the low frequency signal into a plurality of time-intervals according to a plurality of instantaneous phase-sections of the low frequency signal; and segment speech signal according to the boundaries of time-intervals of the low frequency signal.

In this case, the low frequency signal may be a signal having a component corresponding to the theta band of a brain signal of the speech signal.

In this case, the instantaneous phase of the low frequency signal has a value of $-\pi$ to $+\pi$, and the values $-\pi$ to $+\pi$ may be divided into a plurality of phase-sections so that the plurality of phase-sections may be selected therefrom.

In this case, the plurality of phase-sections may be divided into a first phase-section from $-\pi$ to $-\pi/2$, a second phase-section from $-\pi/2$ to 0, a third phase-section from 0 to $\pi/2$, and a fourth phase-section from $+\pi/2$ to $+\pi$.

In this case, the method uses a plurality of speech kernels obtained by modeling a behavior of a basilar membrane for a plurality of central frequencies, and the low frequency signal may be a residual signal that is obtained by removing one or more speech kernel components from the speech signal.

Alternatively, the low frequency signal of the method may be a signal that is obtained by extracting the low frequency band of a speech signal by simply using a low pass filter or a band pass filter.

A method of providing speech feature information according to another aspect of the present invention relates to a method of providing speech feature information by using a plurality of speech kernels obtained by modeling a behavior of a basilar membrane for a plurality of central frequencies, and includes extracting a low frequency signal of a speech signal; segmenting the low frequency signal into a plurality of time-intervals according to a plurality of instantaneous phase-sections of the low frequency signal; extracting one or more speech kernel components from the each segmented speech signal according to the time-intervals of the low frequency signal; and providing following feature information of speech signal: the generation time of each extracted speech kernels and the value of a speech kernel component of each extracted speech kernels.

A method of recognizing speech according to a view of the present invention may be based on the method of segmenting speech signals described above, namely, a method of segmenting speech signal into time-intervals (frames). The method of recognizing the speech extracts the frequency components of speech signals selectively, takes features unique to speech and forms feature vectors robust to noise. To this end, the frequency components of the speech signals are extracted by copying a process where a speech signal is converted into spike (i.e. brain signal) by a cochlea.

In this case, the process of extracting the frequency components of the speech signals is as follows.

Firstly, M speech kernels are generated by copying, through computer modeling, the motions of a basilar membrane for M (for example, 64) central frequencies at which a human sensitively responses. In this case, each speech kernel is a signal that represents the vibration width of the basilar membrane by a corresponding central frequency for a certain time.

Secondly, a plurality of inner product values are calculated by performing inner product on a speech signal to be recognized and each provided speech kernel. In particular, ① an inner product value of each speech kernel and a speech signal is calculated while time-shifting for example, by 1 ms for M speech kernels. For example, when inner product calculations are performed by time-shifting a total of L times ever 1 ms for each speech kernel, a total of M*L inner product values may be calculated. ② Then, the maximum of the M*L inner product values is calculated. ③ Lastly, a part having the maximum inner product value (namely, an inner product value*a corresponding time-shifted speech kernel) is subtracted from the speech signal and then returns to ① in order to repetitively perform the processes above. In this case, when the calculated maximum inner product value is smaller than a user-defined threshold, all processes are stopped.

When the method above is used, it is possible to sequentially extract the important component of the speech signal, it is possible to extract only information on M (for example, 64) fixed frequencies to which a human sensitively responds, and it is possible to know the generation time of each frequency component extracted.

A method of extracting speech feature information according to a view of the present invention may be based on the method of segmenting speech signals described above, namely, a method of segmenting speech signal into time-intervals (frames). The method of extracting speech feature information to be described below may be performed on each frame determined by the method of segmenting the speech signals. The method of extracting the speech feature information includes a feature information extracting process for extracting feature information on speech signals by using the speech signals provided in a time domain and pre-provided M speech kernels. The feature information extraction process uses a total of M*L reference signals that are obtained by shifting each of the M speech kernels by L different spaced-times. Also, the feature information extraction process includes finding the maximum of M*L inner product values obtained by performing an inner product calculation of each of the M*L reference signals and the speech signal, selecting a speech kernel corresponding to the maximum value among the M speech kernels as a maximum speech kernel, selecting a spaced-time corresponding to the maximum value among the L different spaced-times as a maximum speech kernel generation time; and providing information on the maximum speech kernel, the maximum speech kernel generation time, and the maximum value as unit speech feature information on the speech signal. In this case, the unit speech feature information may be interpreted as information corresponding to a spike that is delivered to a brain.

In this case, the M speech kernels may be signals that are obtained by modeling the motion of a basilar membrane for M central frequencies as time vs. amplitude.

Also, the method of extracting the speech feature information may further include a speech signal update process, which may include normalizing the maximum speech kernel by using the maximum value to generate a maximum normalized speech kernel; and subtracting the maximum nollnalized speech kernel from the speech signal used for inner product with each of the M*L reference signals in the feature information extracting process to provide a residual speech signal.

In this case, the feature information extraction process is re-performed after the speech signal update process, wherein the speech signal to be inner product calculated with each of the M*L reference signals in the re-performed feature information extracting process is replaced with the residual speech signal obtained in the speech signal update process.

In this case, the feature information extraction process and the speech signal update process are sequentially repetitively performed, wherein when the maximum value obtained in the feature information extracting process is smaller than a predetermined value, the repetition stops.

In this case, if the feature information extraction process is performed a total of K times until the repetition stops, K sets of unit speech feature information on the speech signal provided through K feature information extracting processes may be provided as speech feature information on the speech signal.

A method of recognizing a speech signal according to another view of the present invention may be provided. The method of recognizing the speech signal relates to a method of recognizing a speech signal by using the above-described speech feature information and includes performing the feature information extraction process and the speech signal update process by using a comparative speech signal different from the speech signal to extract comparative speech feature information that is speech feature information on the comparative speech signal; and extracting the similarity between the speech feature information and the comparative speech feature information.

According to another view of the present invention, it is possible to provide a speech signal processing device that segments a frame of a speech signal input for speech recognition. The device includes a storage unit storing the speech signal and a processing unit for processing the speech signal. In this case, the storage unit stores a program code that enables the processing unit to extract a low frequency signal from the speech signal; and to segment the low frequency signal into a plurality of time-intervals according to a plurality of instantaneous phases of the low frequency signal.

According to another view of the present invention, it is possible to provide a speech signal processing device that provides speech feature information by using a plurality of speech kernels obtained by modeling a behavior of a basilar membrane on a plurality of central frequencies. The device includes a storage unit storing a speech signal and a processing unit for processing the speech signal. In this case, the storage unit stores a program code that enables the processing unit to extract a low frequency signal from the speech signal; segment the low frequency signal into a plurality of time-intervals according to a plurality of instantaneous phase-sections of the low frequency signal; extract one or more speech kernel components from the speech signal of the segmented frame; and provide the generation time of each extracted one or more speech kernels and the value of a speech kernel component of each extracted one or more speech kernels as speech feature information on the speech signal.

According to another view of the present invention, with, a device including a storage unit storing a speech signal and a processing unit for processing the speech signal, it is possible to provide a computer readable medium storing a program code that enables to extract a low frequency signal form the speech signal; and segment the low frequency signal into a plurality of time-intervals according to a plurality of instantaneous phases of the low frequency signal.

In accordance with an exemplary embodiment, a speech signal segmentation method includes segmenting the speech signal into a plurality of time-intervals according to instantaneous phase which is extracted from a first low frequency component of the speech signal.

A first time-interval of the speech signal may be segmented into a plurality of first sub-time-intervals according to the instantaneous phase of the first low frequency component and a second time-interval of the speech signal may be segmented into a plurality of second sub-time-intervals according to instantaneous phase of the second low frequency component.

A frequency band of the first low frequency component may be lower than a frequency band of the second low frequency component.

The segmentation of the speech signal may includes segmenting a second time-interval of the plurality of time-intervals into a plurality of second sub-time-intervals according to instantaneous phase that a second low frequency component of the second time-interval includes.

The second time-interval may be a time-interval that is determined as a consonant part of the speech signal.

The second time-interval may be one of the plurality of time-intervals that its energy value is within the predetermined energy range.

The first low frequency component may be a band corresponding to the theta (θ) band of a brain signal.

The first low frequency component may be a band corresponding to the theta (θ) band of a brain signal and the second low frequency component may be a band corresponding to the gamma (☐) band of the brain signal.

The instantaneous phase may include a value of from −π to +π, the segmentation may be performed according to a plurality of phase-sections of a low frequency signal, and the plurality of phase-sections may be selected from between −π and +π to have exclusive values.

The plurality of phase-sections may be divided into a first phase-section from −π to −π/2, a second phase-section from −π/2 to 0, a third phase-section from 0 to π/2, and a fourth phase-section from +π/2 to +π.

In accordance with another exemplary embodiment, a method of segmenting a speech signal by using a process of segmenting the speech signal into a plurality of frames according to instantaneous phase that a first low frequency component of the speech signal includes performing the process on each of k low frequency components (k=1 to N) of the speech signal to obtain N sets of frame segmentation information; and performing the process by using the s low frequency components (s=1, 2, 3, . . . , or N) having the highest entropy between frames from the N sets of frame segmentation information. Another exemplary embodiment provides a computer readable medium which includes a program code that execute the method of segmenting the speech signal, by a computing device.

Another exemplary embodiment provides a computer readable medium which includes a program that executes segmenting a speech signal into a plurality of time-intervals by a computing device, according to instantaneous phase that a first low frequency component of the speech signal includes.

The program may perform segmenting a first time-interval of the speech signal into a plurality of first sub-time-intervals according to the instantaneous phase that the first low frequency component of the first time-interval includes and segmenting a second time-interval of the speech signal into a plurality of second sub-time-intervals according to instantaneous phase that a second low frequency component of the second time-interval includes, by the computing device.

The speech signal segmentation may include segmenting a second time-interval of the plurality of time-intervals into a plurality of second sub-time-intervals according to instantaneous phase that a second low frequency component of the second time-interval includes.

Another exemplary embodiment provides a computing device that includes a storage unit and a processing unit, wherein the processing unit segments a speech signal into a plurality of time-intervals according to instantaneous phase that a first low frequency component of the speech signal recorded in the storage unit includes.

The processing unit may segment a first time-interval of the speech signal into a plurality of first sub-time-intervals according to the instantaneous phase that the first low frequency component of the first time-interval includes and segment a second time-interval of the speech signal into a plurality of second sub-time-intervals according to instantaneous phase that a second low frequency component of the second time-interval includes.

The speech signal segmentation may includes segmenting a second time-interval of the plurality of time-intervals into a plurality of second sub-time-intervals according to instantaneous phase that a second low frequency component of the second time-interval includes.

In accordance with an exemplary embodiment, a speech signal processing device extracting speech feature information by using a plurality of speech kernels obtained by modeling a behavior of a basilar membrane for a plurality of central frequencies, includes storage unit; and a processing unit for processing the speech signal, wherein the storage unit stores a program code to enable the processing unit to: segment the speech signal into a plurality of time-intervals according to instantaneous phase that a low frequency component of the speech signal includes; extract one or more speech kernel components from the speech signal of the segmented one time-interval; and extract the generation time and size of each of the extracted one or more speech kernels as speech feature information on the speech signal.

BRIEF DESCRIPTION OF THE DRAWINGS

Exemplary embodiments can be understood in more detail from the following description taken in conjunction with the accompanying drawings, in which:

FIGS. 10A and 10B depict how advantageous a method of segmenting a speech signal into frames according to an embodiment of the present invention is as compared to other methods;

FIG. 14 is a table where the number of frames used by a conventional technology using a fixed frame length is compared with the number of frames used in an embodiment of the present invention using a variable frame length.

DETAILED DESCRIPTION OF EMBODIMENTS

Embodiments of the present invention are described below in detail with reference to the accompanying drawings so that a person skill in the art may easily practice the present invention. However, the present invention may be implemented in several different forms and is not limited to embodiments that are described herein. The terms used herein are just intended to mention specific embodiments and not intended to limit the present invention. Also, singular terms used herein also include plural forms unless referred to the contrary.

<Method 1 of Segmenting Speech Signal Frame>

FIGS. 1A to 1E represent a process of determining frame borders and time-intervals for processing a speech signal including phoneme /p/ according to an embodiment of the present invention. The horizontal axes of graphs in FIGS. 1A to 1E are time axes and show 0 ms to 43 ms.

The vertical axes of FIGS. 1A to 1E represent an amplitude of a speech signal, an amplitude of a low frequency signal among the speech signal, an instantaneous phase value of the low frequency signal, a divided frame boundary of the speech signal, and a magnitude of normalized energy for the divided frame.

Figure 1:
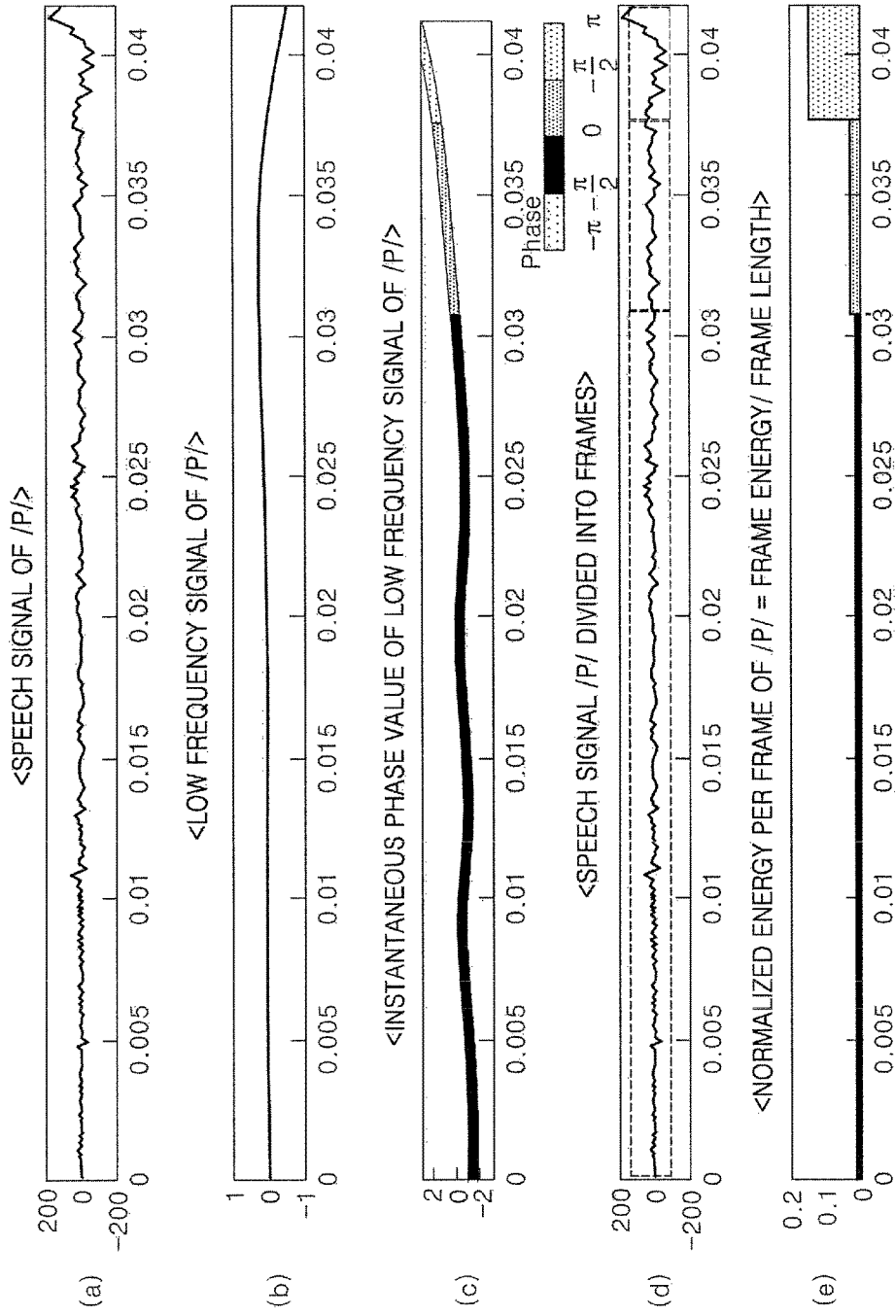
FIGS. 1A to 1E depict a method of extracting a frame of a speech signal /p/ according to an embodiment of the present invention.
Figure 2:
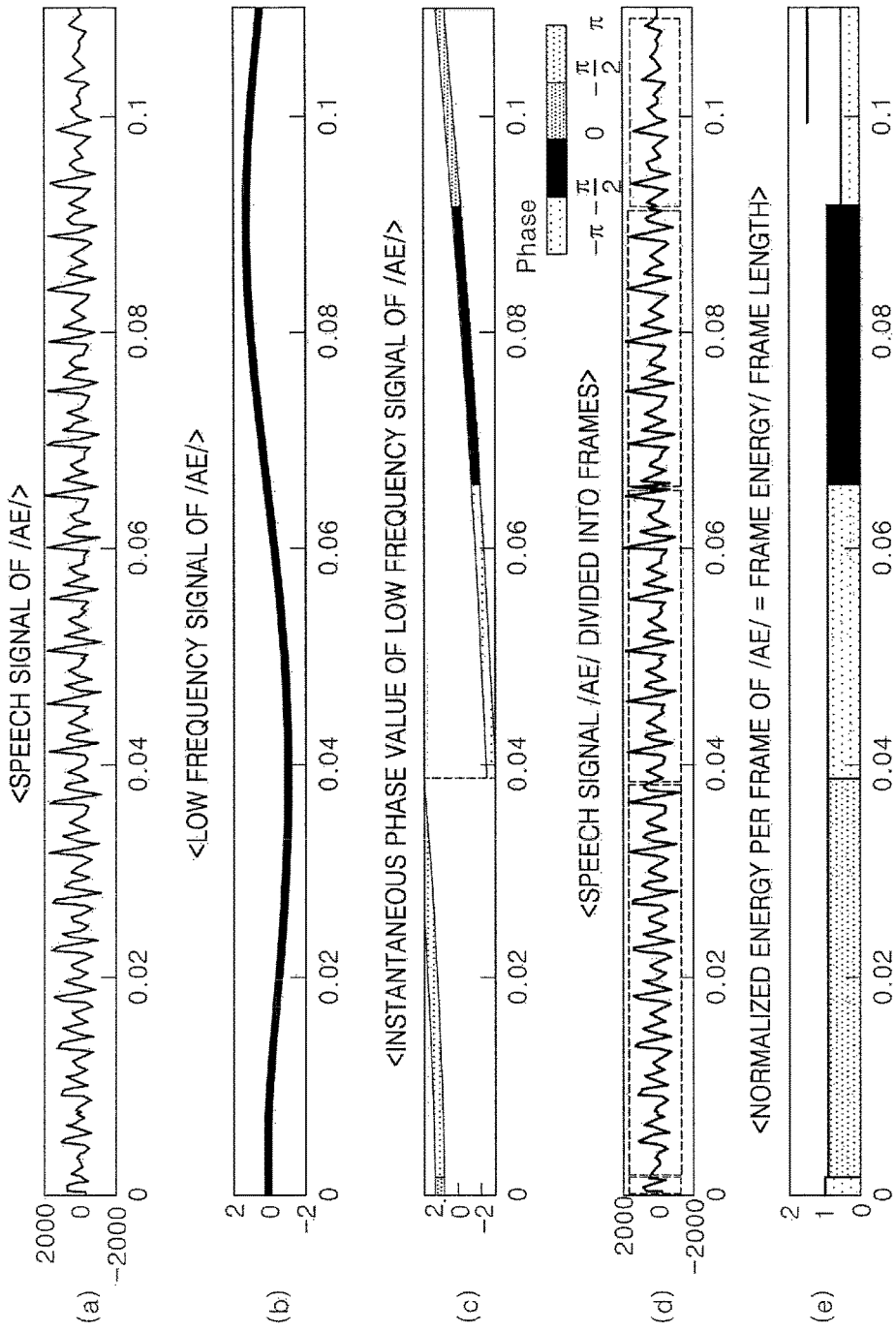
FIGS. 2A to 2E depict a method of extracting a frame of a speech signal /ae/ according to an embodiment of the present invention.

FIG. 1B shows a signal obtained by extracting only 3 Hz to 9 Hz components from the signal in FIG. 1A. It is also possible to extract other low frequency bands instead of 3 Hz to 9 Hz. For example, it is possible to extract a theta Θ band signal among brain waves.

FIG. 1C shows instantaneous phase information of the signal in FIG. 1B and the information may be obtained by using conversion such as Hilbert transform. When using the Hilbert transform, instantaneous phase may have a value within a range of [π to π]. The range [−π to π] in which the instantaneous phase may have a value may be divided into four phase-sections that are [−π to −π/2], [−π/2 to 0], [0 to π/2], and [π/2 to π]. In FIG. 1C, the phase-section [−π/2 to 0] exists for about 32 ms, the phase-section [0 to π/2] exists for about 13 ms, and the phase-section [π/2 to π] exists for about 7 ms. Although the low frequency speech signal of /p/ is divided into three speech signal time-intervals, namely, three frames in FIG. 1C, the low frequency speech signal may also be divided into four or more frames in some cases according to the type of phoneme. Also, although the range [−π to π] within which an instantaneous phase may have a value is divided into four phase-sections in FIG. 1C, it may also be divided into any number of phase-sections.

FIG. 1D shows three speech signal time-intervals (frames) determined in FIG. 1C along with the speech signal in FIG. 1A.

FIG. 1E represents frame-based normalized energy that is obtained by dividing, the energy of a speech signal belonging to each frame determined in FIG. 1C, by the length of each frame. It may be seen that the normalized energy of a third frame is greatest, which is because information on phoneme /p/ that is consonant is mainly located at the last part of /p/.

FIGS. 1A to 1E represent results of analyzing consonant phoneme /p/and FIGS. 2A to 2E represent results of analyzing vowel phoneme /ae/ in the same way as FIGS. 1A to 1E. However, there is a difference that the length of a speech signal to be analyzed is about 150 ms. Also, there is a difference that the low frequency signal of /ae/ is divided into a total of five frames (speech signal time-intervals) (See FIGS. 2C and 2D). In addition, it may be seen that the normalized energy difference between frames is smaller than that in FIG. 1E. This is because vowel information is maintained evenly over the entire time-intervals.

Figure 3:
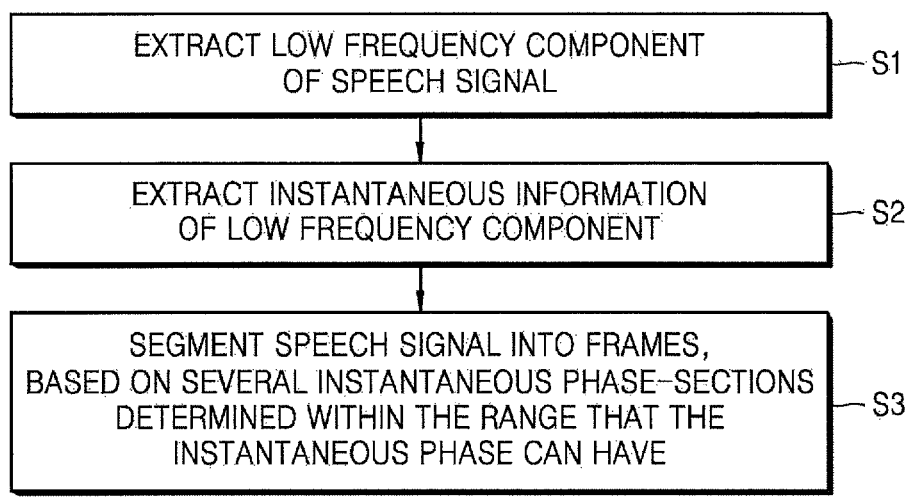
FIG. 3 is a flowchart of a method for dividing a speech signal into frames according to an embodiment of the present invention.

FIG. 3 is a flowchart of a method of dividing speech signal into frames (time-intervals) according to an embodiment of the present invention.

In step S1, low frequency components of a given speech signal are extracted. In this case, the low frequency components may be extracted by simply passing the speech signal through a low-frequency band pass filter.

In step S2, instantaneous phase information on the extracted low frequency components is extracted. In this case, conversion such as Hilbert transform may be used.

In step S3, based on a plurality of instantaneous phase-sections selected from a range of values that the instantaneous phase may have, it is possible to segment the low frequency components into a plurality of time-intervals (speech signal time-intervals) and thus generate a plurality of frames (speech signal time-intervals). In this case, the range of values that the instantaneous phase may have is [−π to π], the plurality of instantaneous phase-sections may be four phase-sections [−π to π/2], [−π/2 to 0], [0 to π/2], and [π/2 to π]. However, the present invention is not limited to the above particular values. If other method rather than Hilbert transform is chosen for extract instantaneous phase, the above range of value may be different from [−π to π].

Figure 7:
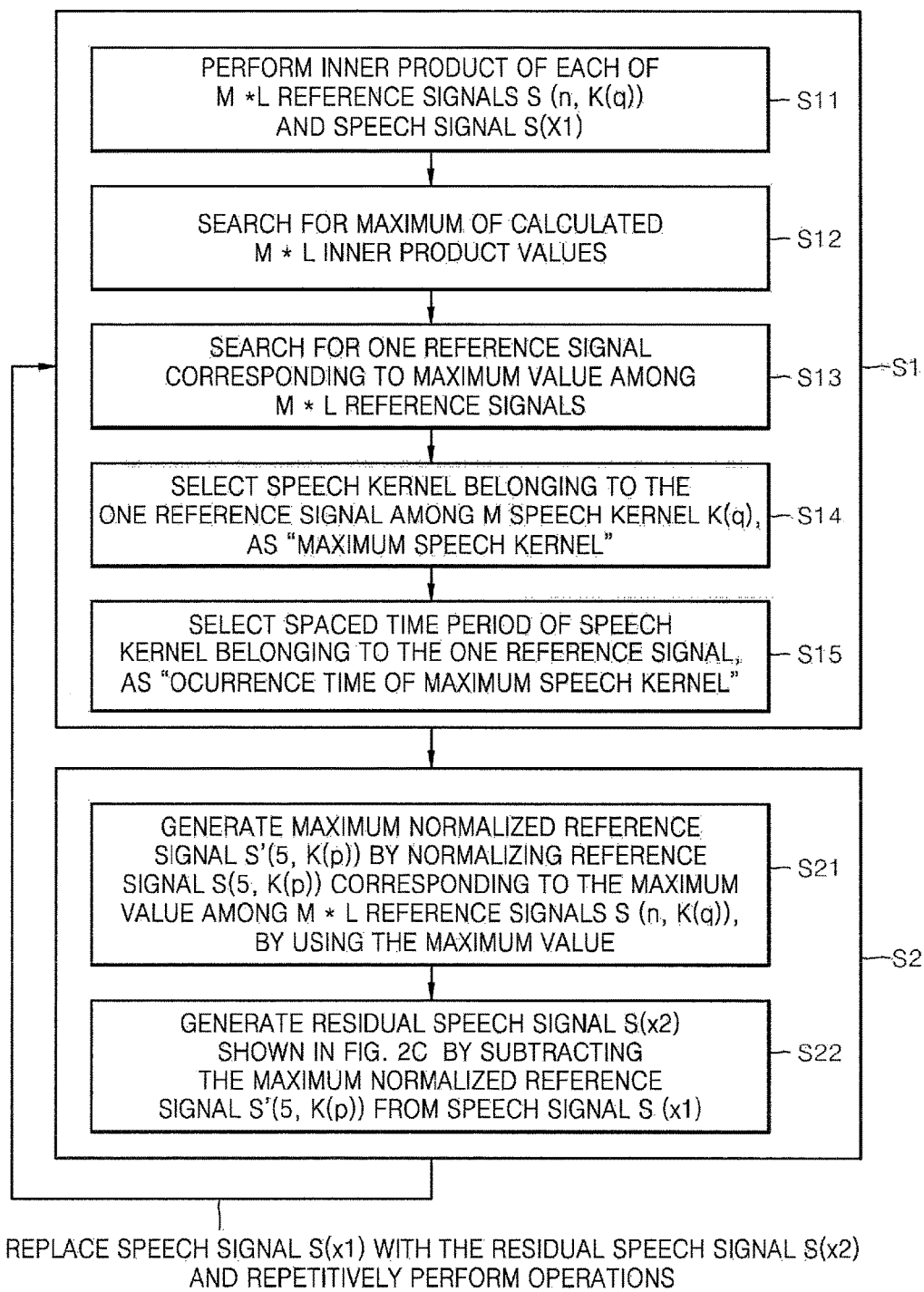
FIG. 7 is a flowchart of a method of extracting speech feature information according to an embodiment of the present invention.

Although the above description provides that the lower frequency components may be obtained by using a low pass filter, a residual signal to be described in step S22 in FIG. 7 may otherwise be used as the low frequency components. The residual signal may also be interpreted as the above-described LFP rather than simply the low frequency components of the given speech signal. That is, in step S2, it is not that a low frequency component signal from which instantaneous phase information is extracted can be obtained by using only one unique technique.

<Speech Kernel>

Figure 4A:
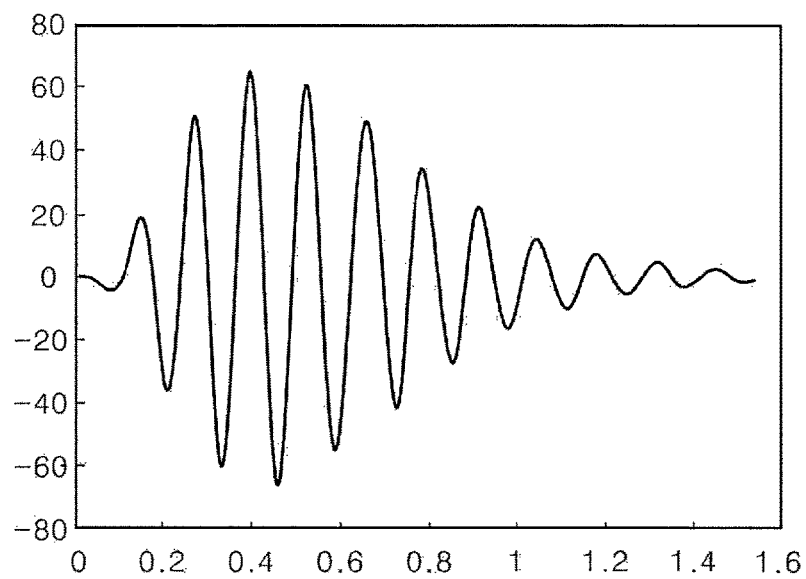
FIGS. 4A to 4C depict speech kernels used in an embodiment of the present invention.
Figure 4B:
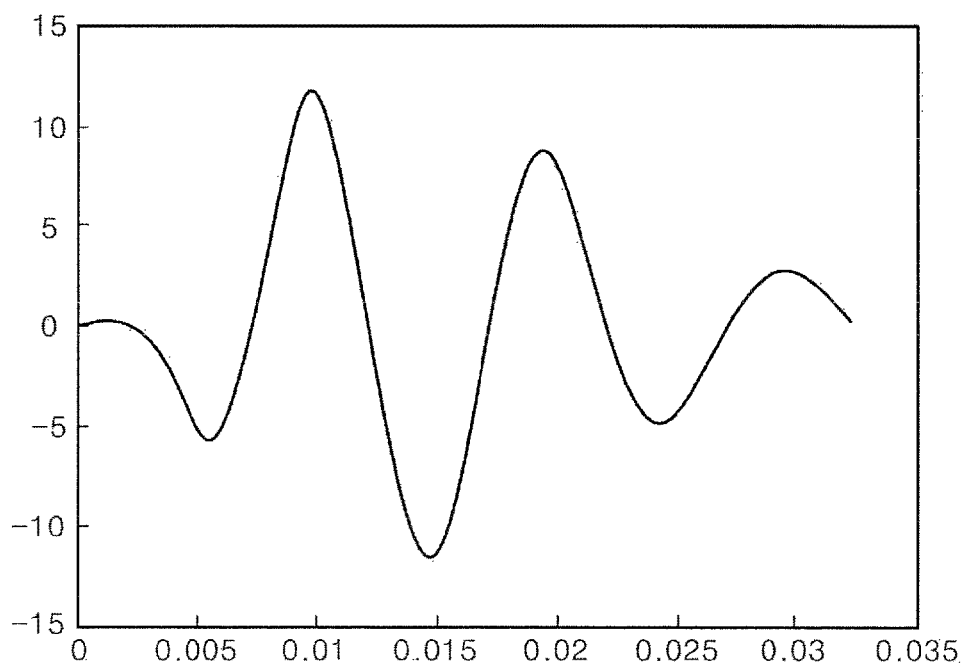
Figure 4C:
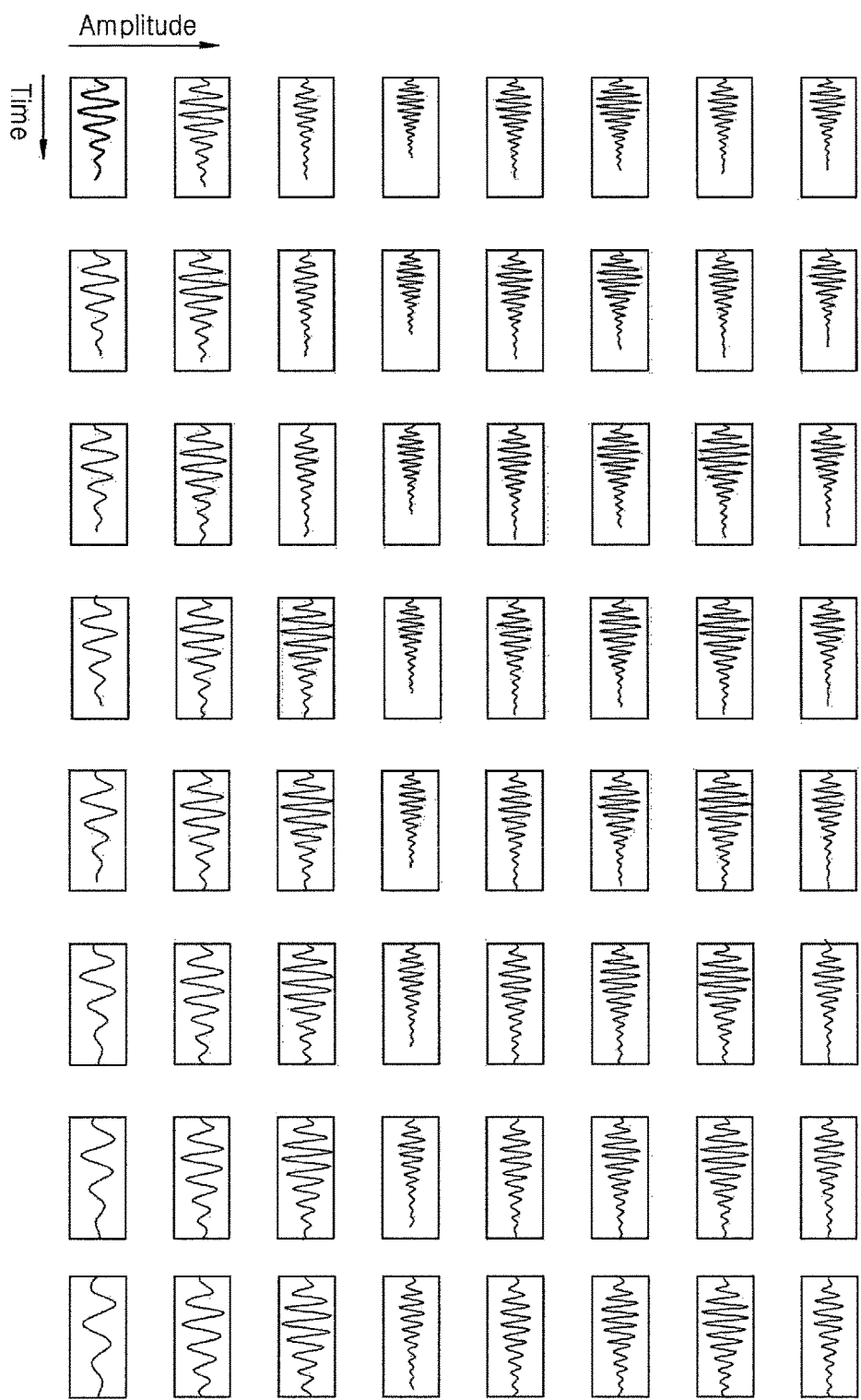

FIGS. 4A to 4C depict speech kernels used in an embodiment of the present invention.

It is known that there is central frequencies which belong to human's audible frequencies and at which a human especially sensitively responds. It is known that the number of the central frequencies is usually 64 (M) (However, M may be modeled to have other values instead of 64). In an embodiment of the present invention, the motion of a basilar member for the M central frequencies is firstly copied through computer modeling to generate M speech kernels. The basilar member is a portion of human's auditory organs and includes a tissue vibrating in response to a sound.

Each of the speech kernels is a signal representing the vibration width of the basilar membrane by a corresponding central frequency for a certain time and related examples are represented in FIGS. 4A to 4C. FIGS. 4A and 4B represent respectively examples of two speech kernels for two specific central frequencies, the horizontal axes represent times and the vertical axes represent the vibration widths of the basilar membrane excited by corresponding central frequencies. Time periods during which the basilar member vibrates at different central frequencies may be different. Thus, the minimum values of the horizontal axes of the speech kernels represented in FIGS. 4A and 4B start with 0 second but the maximum values may be the same or different. Even if the vibration times of the basilar membrane for different central frequencies are different, it is possible to equally make the length of the horizontal axe of each speech kernel.

FIG. 4C depicts, as 64 speech kernels, the vibration widths of a basilar membrane by 64 central frequencies at which a human especially sensitively responds, In this case, the 64 central frequencies may have the same or random frequency intervals. The horizontal axis of the 64 speech kernels represents a time and the vertical axis represents the vibration width of a basilar membrane excited by a corresponding central frequency.

<Feature Information Extracting Process>

Figure 5A:
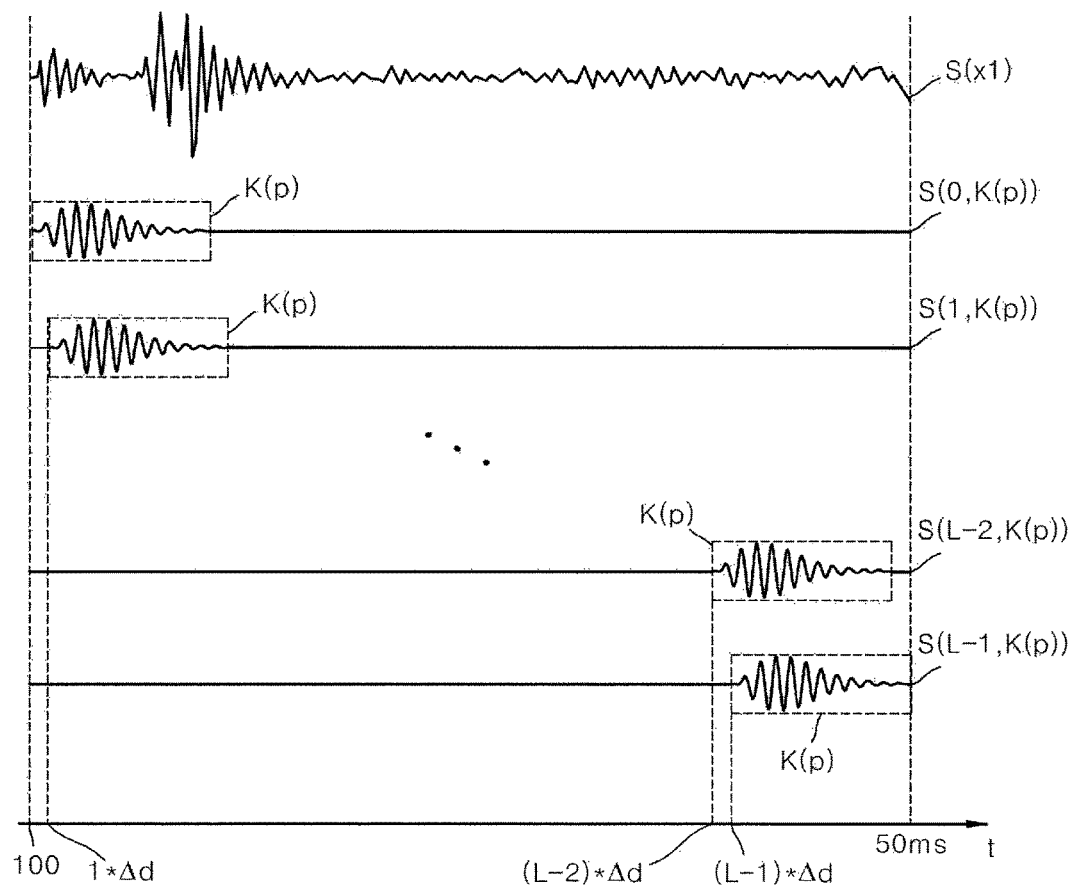
FIG. 5A depicts a feature information extracting process of extracting feature information of a speech signal according to an embodiment of the present invention.

FIG. 5A depicts a feature information extracting process step S1 of extracting feature information of a speech signal according to an embodiment of the present invention.

In the feature information extracting process step S1, it is possible to extract unit feature information of a speech signal $S(x1)$ by using the speech signal $S(x1)$ given for analysis and pre-provided M (for example, 64) speech kernels $K(q)$ (where, q is an integer number and $1 \leq q \leq M$). In this case, the time length of the speech signal $S(x1)$ may be provided to be equal to or greater than the time length of each speech kernel.

The feature information extracting process may use a total of M*L reference signals $S(n, K(q))$ that are obtained by shifting each of the M speech kernels K (q) by L different spaced times (where, n is an integer number and 0≤n≤L−1, and q is an integer number and 1≤q≤M).

For example, L reference signals S (n, K(p)) represented in FIG. 5A are obtained by using a pth speech kernel K(p) among the M speech kernels. Each of the L reference signals S (n, K (p)) includes the waveform corresponding to the pth speech kernel K (p) at some part. In this case, the pth speech kernel K (p) in the reference signal S (n, K (p)) starts from a time delayed by (n−1)*Δd from the start point 100 of the speech signal S(x1) (where, Δd is a unit spaced time period). In addition, others excluding the pth speech kernel K (p) included herein among the reference signals S (n, K(p)) have a value of zero.

Although FIG. 5A shows only L reference signals generated by using the pth speech kernel K (p), it may be understood that it is possible to generate L reference signals for each of other speech kernels K (q) instead of the pth speech kernel K (p) among M speech kernels. As a result, it is possible to generate a total of M*L reference signals S (n, K (q)) from M speech kernels. Such M*L reference signals S (n, K (q)) may be pre-stored.

The time interval from the start point of each reference signal S (n, K (q)) generated by using the above technique to the start point of qth speech kernel K (q) included herein may be referred to as a "spaced time period" below.

It is possible to perform an inner product calculation on each of a total of M*L reference signals S (n, K (q)) generated by using the above technique and the speech signal S(x1) in step S11. As a result, a total of M*L inner product values may be calculated. It is possible to search for the maximum of the calculated M*L inner product values in step S12. In addition, it is possible to search for a reference signal corresponding to the maximum value among the M*L reference signals in step S13. In this case, the speech kernel belonging to the reference signal corresponding to the maximum value among the M speech kernels K (q) may be defined and selected as a "maximum speech kernel" in step S14. Also, the above-described spaced time of the speech kernel belonging to the reference signal to which the maximum value corresponds may be defined and selected as a "maximum speech kernel generation time point" in step S15. Particular examples are described with reference to FIG. 5B.

Figure 5B:
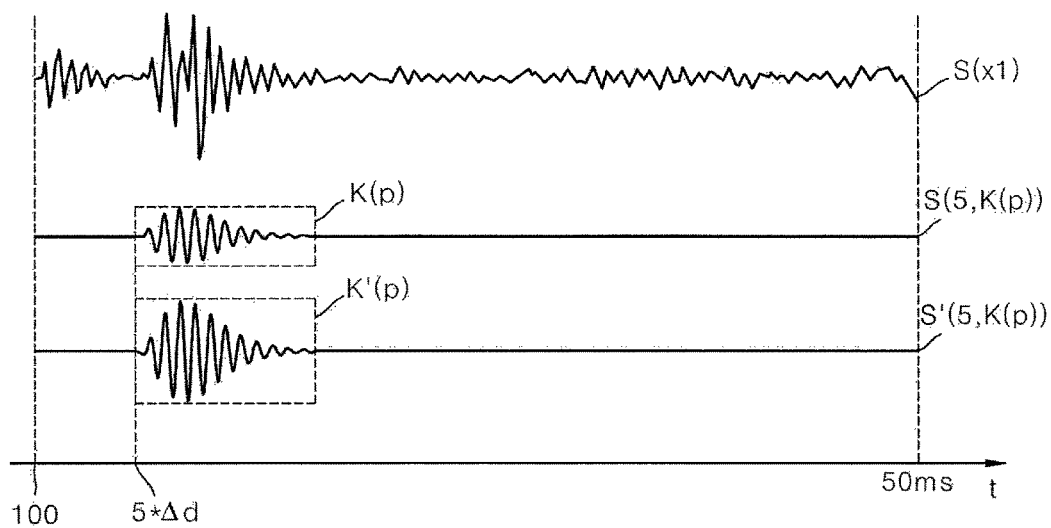
FIG. 5B shows only a reference signal corresponding to the maximum value of M*L reference signals S (n, K (q)) depicted in FIG. 5A, along with the speech signal.

FIG. 5B shows only a reference signal corresponding to the above-described maximum of M*L reference signals S (n, K (q)) depicted in FIG. 5A, along with the speech signal. FIG. 5B assumes that a reference signal corresponding to the maximum value is S (5, K (p)). That is, the start time of a pth speech kernel K(p) in the reference signal is 5*Δd delayed than the start time 100 of the reference signal S (x1).

In FIG. 5B, the above-described maximum speech kernel may be determined as K (p) and the above-described maximum speech kernel generation time may be determined as 5*Δd.

After the above processes are ended, information on the maximum speech kernel, the maximum speech kernel generation time, and the maximum value that are described above may be defined and provided as unit speech feature information on the speech signal.

Figure 6A:
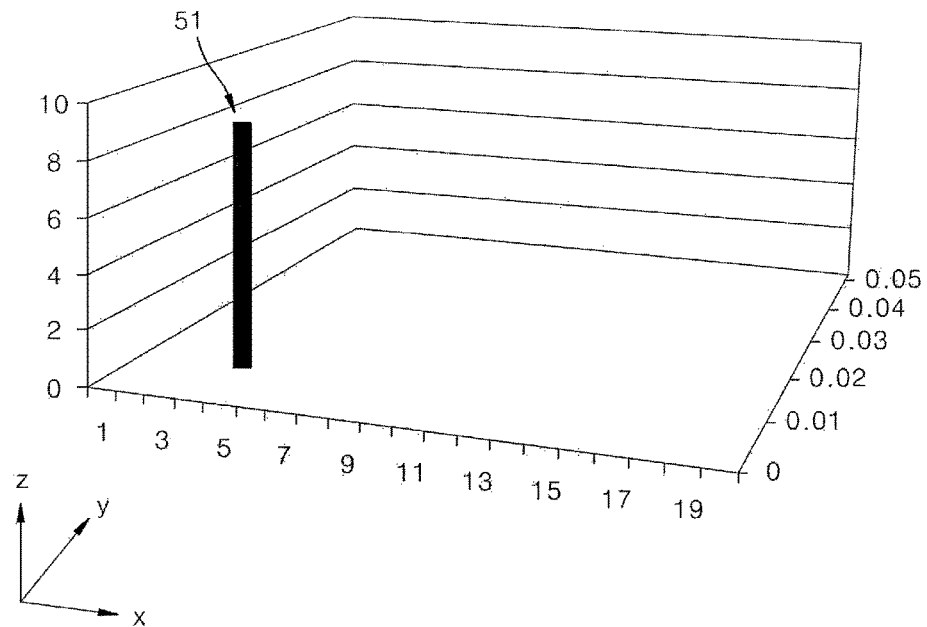
FIG. 6A is an example of a graph that 3-dimensionally represents one piece of unit speech feature information obtained according to an embodiment of the present invention.

The above-described unit speech feature information may be represented as in FIG. 6A.

FIG. 6A is an example of a graph that 3-dimensionally represents one piece of unit speech feature information obtained according to an embodiment of the present invention. In FIG. 6A, the x axis represents an identification number of the maximum speech kernel, the y axis represents the maximum speech kernel generation time, and the z axis represents the maximum value.

In FIG. 6A, one piece of unit speech feature information 51 that is obtained by performing steps S11 to S15 described above is represented. The one piece of unit speech feature information 51 includes the identification number of the above-described maximum speech kernel, the maximum speech kernel generation time, and related maximum value information.

<Speech Signal Update Process>

If the above-described feature information extracting process, step S1 is completed, it is possible to perform a speech signal update process, step S2 to be described below. The speech signal update process is described with reference to examples represented in FIGS. 5A and 5B.

Figure 5C:
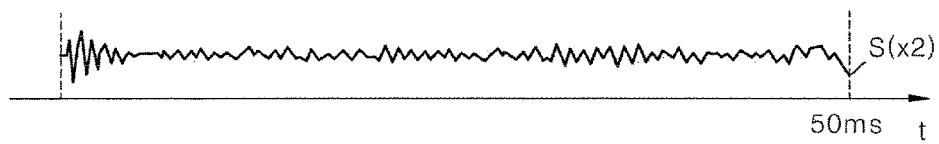
FIG. 5C is an example of a residual speech signal according to an embodiment of the present invention.

In the speech signal update process, it is possible to firstly generate a maximum normalized reference signal S' (5, K(p)) by normalizing the reference signal 5 (5, K (p)) corresponding to the maximum value among the M*L reference signals S (n, K (q)) by using the maximum value in step S21. In this example, the term "normalizing" may mean a process of multiplying the reference signal S (5, K (p)) by the maximum value or a value proportional to the maximum value. Next, it is possible to generate the residual speech signal S (x2) as shown in FIG. 5C by subtracting the maximum normalized reference signal S' (5, K (p)) from the speech signal S (x1) used in the feature information extracting process, in step S22.

Next, it is possible to re-perform the feature information extracting process after the speech signal update process. In the re-performed feature information extracting process, the speech signal S (x1) on which an inner product calculation is performed along with each of the M*L reference signals S (n, K(q)) is replaced with the residual speech signal S (x2) obtained from the speech signal update process. If the feature information extracting process is again performed in this way, it is possible to obtain the above-described unit speech feature information one more. A newly obtained piece of unit speech feature information may be added to FIG. 6A.

Figure 6B:
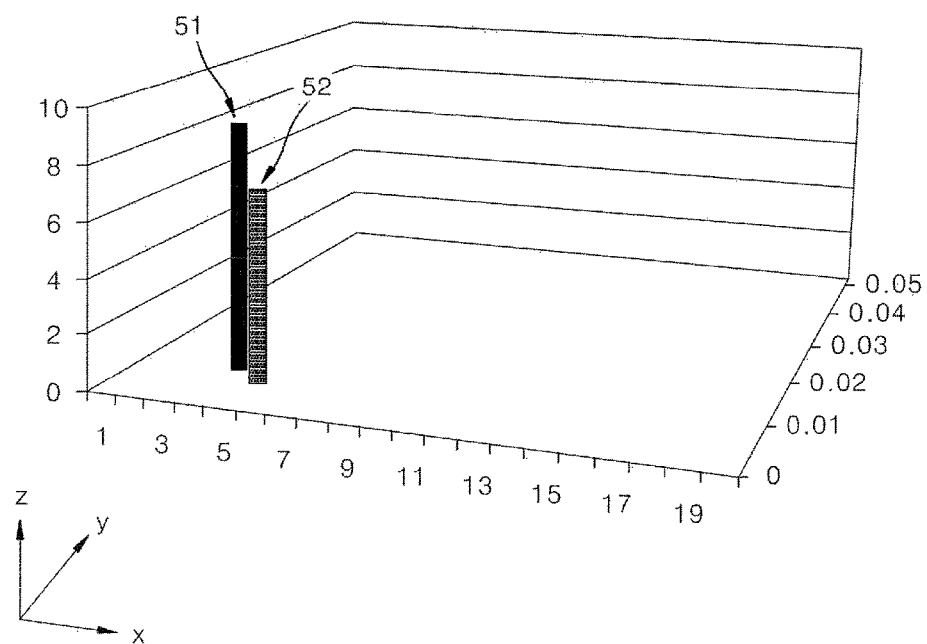
FIG. 6B shows two pieces of unit speech feature information obtained by performing, two times repeatedly, a feature information extracting process according to an embodiment of the present invention.

FIG. 6B shows two pieces of unit speech feature information obtained by performing, two times, a feature information extracting process according to an embodiment of the present invention.

In FIG. 6B, the x axis represents an identification number of the maximum speech kernel, the y axis represents the maximum speech kernel generation time, and the z axis represents the maximum value. In FIG. 6B, in addition to the above-described piece of unit speech feature information 51, another piece of unit speech feature information obtained by re-performing steps S11 to S15 is further shown.

It is possible to continuously repeat the feature information extracting process and the speech signal update process that are described above. However, if the maximum value obtained in the feature information extracting process becomes smaller than a predetermined value, it is possible to stop the repetition. If the feature information extracting process is performed a total of K times until the repetition stops, a set of K pieces of unit speech feature information on the speech signal provided through the K feature information extracting processes, may be provided as speech feature information 90 on the speech signal S(x1) in FIG. 5A.

Figure 6C:
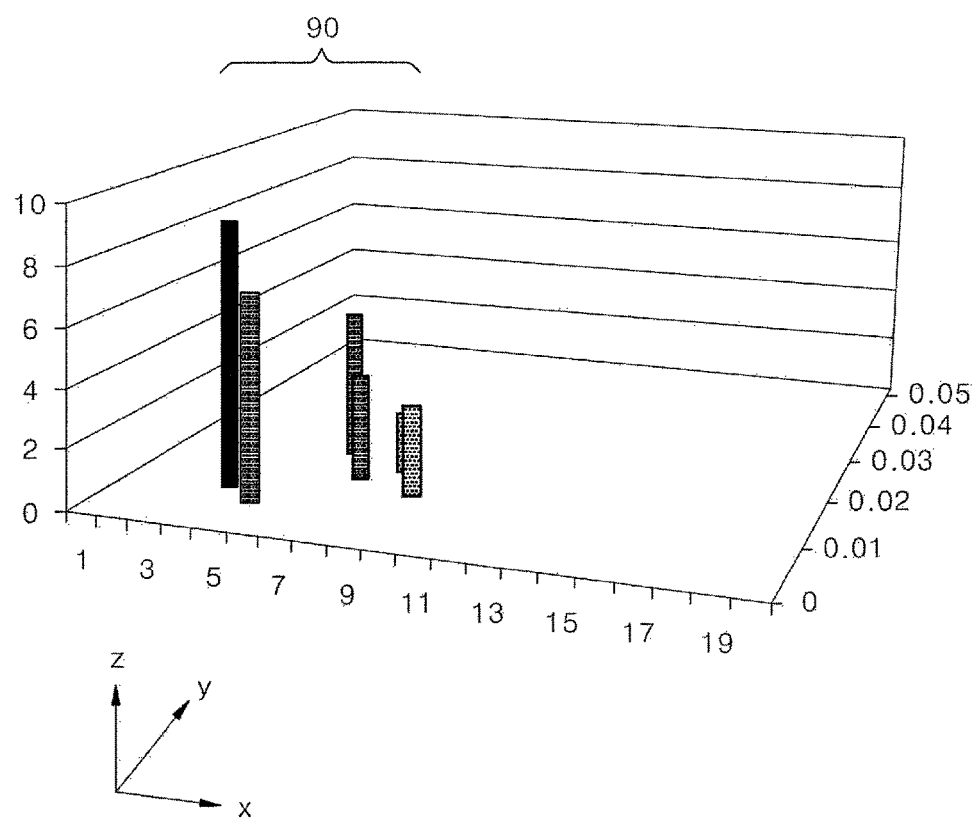
FIG. 6C are exemplary graphs of K pieces of speech feature information that may be obtained when performing a speech information extracting method by performing, K times repeatedly, a feature information extracting process and a speech signal update process according to an embodiment of the present invention.

FIG. 6C are exemplary graphs of K pieces of speech feature information that may be obtained when performing a speech information extracting method by repeating, K times, a feature information extracting process and a speech signal update process according to an embodiment of the present invention. In this example, K=6.

<Speech Recognizing Method>

The speech feature information that may be obtained by repetitively performing the feature information extracting process and the speech signal update process may be used for speech recognition. For example, by using H clear phonemes without noise as a reference speech signal corresponding to the speech signal S (x1) and by using the speech feature information extracting method according to an embodiment of the present invention, it is possible to generate and store H sets of reference speech feature information correspondingly. Next, by using a target phoneme to be recognized as a comparative speech signal corresponding to the speech signal S (x1) and by using the speech feature information extracting method according to an embodiment of the present invention, it is possible to generate one set of comparative speech feature information correspondingly. Next, by comparing the one set of comparative speech feature information with the H sets of reference speech feature information, it is possible to select a most similar set of reference speech feature information. In this case, it is possible to determine that a phoneme that the selected one set of reference speech feature information represents corresponds to the one comparative phoneme.

FIG. 7 is a flowchart of a speech feature information extracting method according to an embodiment of the present invention and sequentially represents steps S1, S2, S11 to S15, and S21 to S22 that are described above.

When adopting a speech signal frame segmenting method according to an embodiment of the present invention, it is possible to extract frequency information with frames less than when extracting frequency information on a speech signal while shifting a typical frame having a fixed size by a fixed value.

In order to verify the effect of the present invention, as a result of performing a syllable-based recognizing experiment, the length of a frame in a vowel becomes longer than when using a typical technique and the length of a frame in a consonant becomes shorter than when using a typical technique. In general, since a vowel has a periodically repeated feature and a consonant has a non-periodically repeated property, it is possible to obtain a result that shows higher recognition accuracy with frames less than a typical (30 ms frame, 10 ms shift) technique when performing syllable recognition by using a frame segmenting technique according to an embodiment of the present invention.

On the other hand, the current speech recognition technology uses distributed speech recognition (DSR) in which speech information is extracted by a terminal and transmitted to a server for recognition. When using a speech signal frame segmenting method according to an embodiment of the present invention, (1) since an amount of information to be transmitted to a server is little, a processing speed is enhanced and (2) since it is possible to extract the feature of each phoneme more accurately, the server needs less DB. Furthermore, information may be processed directly by the terminal without being transmitted to the server.

<Method 2 of Segmenting Speech Signal Frame>

Figure 8:
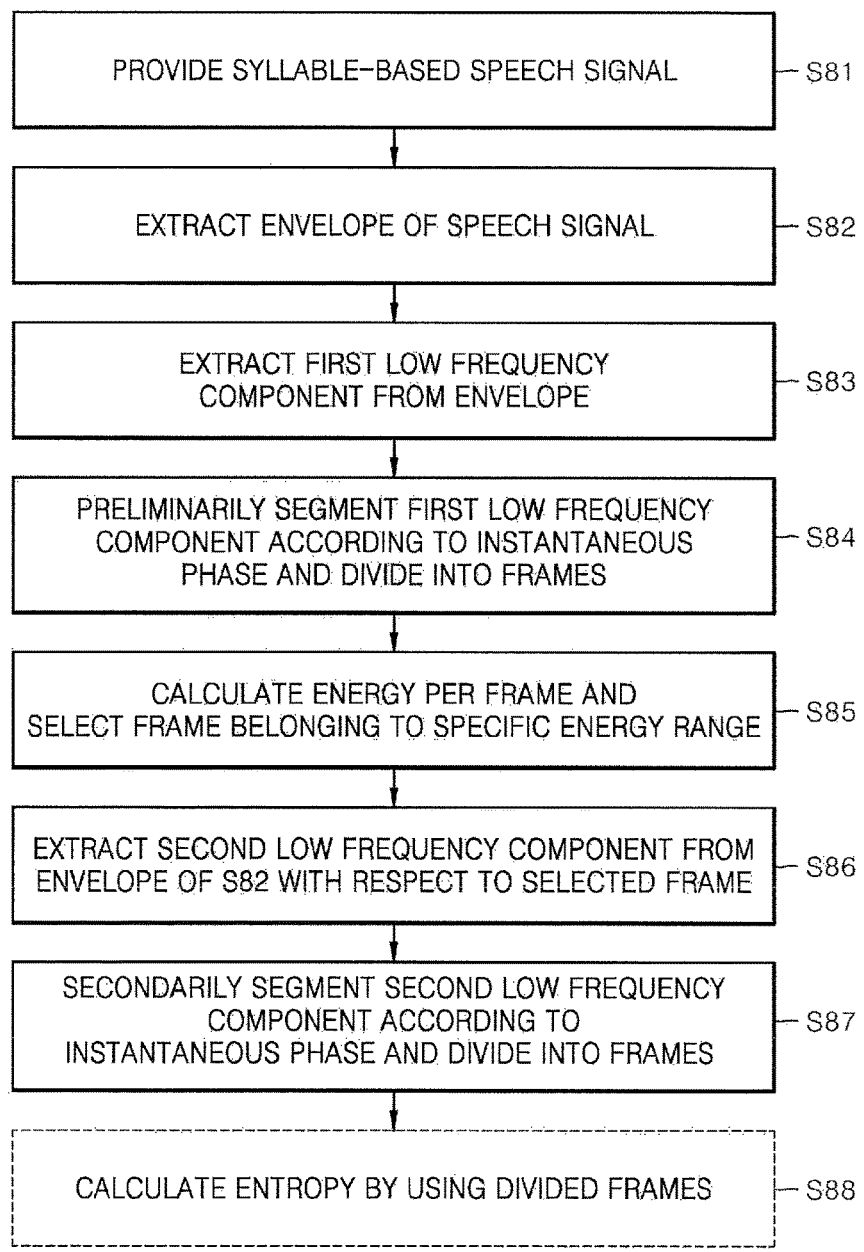
FIG. 8 is a flowchart of a method for dividing a speech signal into frames according to an embodiment of the present invention.

FIG. 8 is a flowchart of a method of dividing a speech signal into frames according to an embodiment of the present invention.

In step S81, a syllable-based speech signal is provided. In this case, one syllable may be made by consonants, vowels, or a combination thereof.

In step S82, the envelope of the speech signal is extracted.

In step S83, a first low frequency component (e.g. 4 to 10 Hz) is extracted from the extracted envelope. In this case, phase information on the first low frequency component may have a value within a range of $-\pi$ to $+\pi$.

In step S84, the phase of the extracted first low frequency component is divided into four phase-sections, a first phase-section from $-\pi$ to $-\pi/2$, a second phase-section from $-\pi/2$ to 0, a third phase-section from 0 to $\pi/2$, and a fourth phase-section from $+\pi/2$ to $+\pi$ to preliminarily segment the speech signal. In this case, according to the shape of a waveform according to the time of the first low frequency component, each of the first to the fourth phase-sections may be made as single continuous time-interval or as discontinuous several time-intervals. As a result, the first low frequency components may be made as one to four or more time-intervals.

In step S85, energy for each frame (time-interval) generated through segmentation is calculated, and a time-interval belonging to a specific energy range preset in order to determine whether there is a consonant is determined as a consonant time-interval.

In step S86, a second low frequency component (e.g., 25 Hz to 30 Hz) is extracted from the consonant time-interval selected in step S85 among the envelope of the speech signal extracted in step S82. In this case, the second low frequency component may averagely be a higher band than the first low frequency component in average.

In step S87, phase information on the extracted second low frequency component is extracted. In this case, phase information on the second low frequency component may have a value within a range of $-\pi$ to $+\pi$. Next, the phase of the extracted second low frequency component is divided into four phase-sections, a first phase-section from $-\pi$ to $-\pi/2$, a second phase-section from $-\pi/2$ to 0, a third phase-section from 0 to $\pi/2$, and a fourth phase-section from $+\pi/2$ to $+\pi$ to secondarily segment the speech signal. In this case, according to the shape of a waveform according to the time of the second low frequency component, each of the first to the fourth phase-sections may be made as single continuous time-interval or as discontinuous several time-intervals (frames). As a result, the second low frequency component may be made as one to four or more time-intervals.

If the speech signal is segmented into N time-intervals in preliminary segmentation of step S84, it is determined that one of the N time-intervals is a consonant time-interval in step S85, and the one consonant time-interval is segmented into M (sub-)time-intervals in the secondary segmentation of step S87, the speech signal may be segmented into a total of N−1+M time-intervals (frames). In this case, the N−1+M frames may have different frame lengths and do not overlap to each other on the time axis. By randomly adjusting the start time and/or end start of each frame, time portions where the N−1+M frames overlap on the time axis may appear through post-processing. Speech signal processing may be performed by using N−1+M frames that do not overlap, or by using N−1+M frames provided through the post-processing.

After step S87, it is possible to calculate the entropy of step S88 as needed. A related description is provided in more detail with reference to FIG. 12.

Figure 9:
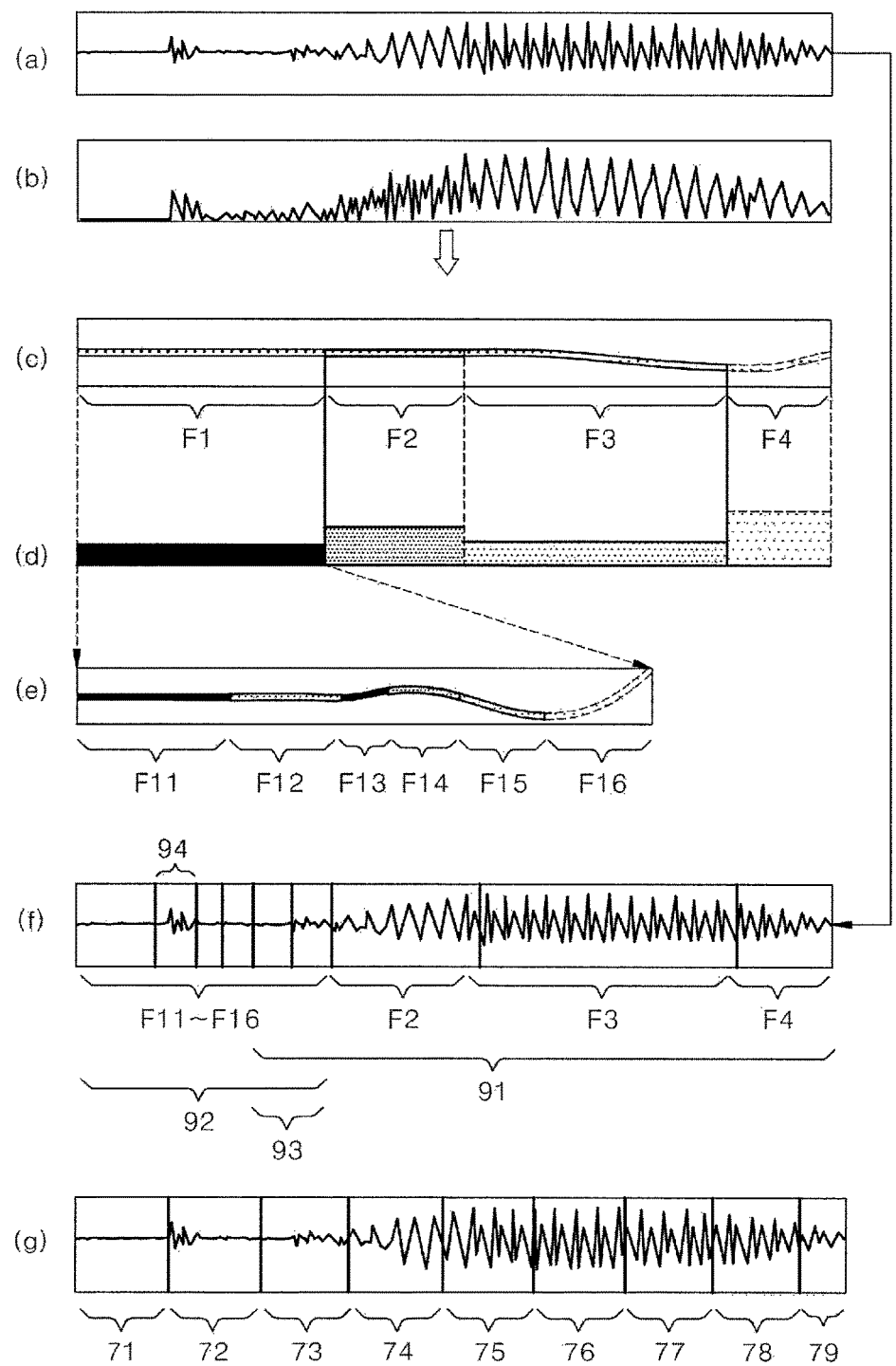
FIGS. 9A to 9G are examples of output that are drawn from each step of the method of segmenting a speech signal frame described in FIG. 8.

FIGS. 9A to 9G are examples of an output that is drawn from each step of the method of segmenting a speech signal frame described in FIG. 8. FIG. 9A represents a syllable-based speech signal waveform of step S81 where the horizontal axis represents a time and the vertical axis represents the energy of a sound wave. FIG. 9B represents the envelope of the speech signal extracted in step S82 where the horizontal axis represents a time and the vertical axis represents energy. FIG. 9C represents the first low frequency component extracted in step S83 where the horizontal axis represents a time and the vertical axis represents energy. In FIG.

9C, frames F1 to F4 represent four (N) frames preliminarily segmented according to phase in step S84. FIG. 9D represents energy for each frame (time-interval) generated through the preliminary segmentation in step S85. In this example, frame F1 is determined as a time-interval belonging to a specific energy range described in step S85. FIG. 9E is a waveform that may be obtained as a result of performing step S86. That is, FIG. 9E represents a second low frequency component (e.g., 25 Hz to 30 Hz) extracted from a part corresponding to frame F1 among the envelope represented in FIG. 9B. In FIG. 9E, the horizontal axis represents a time and the vertical axis represents energy (Frame F1 represents a first low frequency component and frames F11 to F16 represent second low frequency components). In FIG. 9C, frames F11 to F16 represent six frames secondarily segmented by step S87 according to the phase of a low frequency waveform by FIG. 9E. FIG. 9F represents an example of segmenting the speech signal of FIG. 9A into frames that may be obtained through a series of steps represented in FIG. 8, and it may be observed that the speech signal is divided into a total of nine frames (F2 to F4, and F11 to F16). In this example, a time-interval 91 represents a vowel time-interval, a time-interval 92 represents a consonant time-interval, a time-interval 93 represents a transition time-interval from consonant to vowel, and a time-interval 94 (F12) represents a time-interval that includes a consonant's peak component. Referring to FIG. 9F, it is may be seen that the length of a frame is short and compact at a consonant part that has a non-periodic property. Also, it may be seen that since information on the peak component of a consonant part is in a frame, corresponding information is not scattered. Also, it may be seen that the number of frames in a consonant area is four to six and the number of frames in a vowel area is three to five. In contrast, FIG. 9G represents an example of segmenting the speech signal of FIG. 9A at a certain interval by using a typical frame segmenting method. In FIG. 9G, the speech signal is segmented into a total of nine frames 71 to 79 but it may be seen that the number of frames in a consonant area is four to three and the number of frames in a vowel area is six. Thus, the frame segmenting technique of FIG. 9F may analyze the consonant area more finely as compared to the frame segmenting technique of FIG. 9G. Also, according to the frame segmenting technique of FIG. 9G, since the frames in the vowel area having a periodic property repetitively provide the same information, analysis efficiency may be low.

FIG. 10 depicts how advantageous a method of segmenting a speech signal into variable frames according to an embodiment of the present invention is as compared to other methods. FIG. 10 normalizes and compares entropy (spectral difference) between frames when segmenting a frame by using various methods by using a speech signal sample. In this example, when 24 vectors are extracted for each frame, it may be defined that an entropy value increases as the distance between vectors between frames increases. It may mean that a difference in information that each frame contains increases as entropy increases. In FIGS. 10A and 10B, the vertical axis represents the magnitude of normalized entropy.

Graphs 101 to 104 in FIG. 10A represent entropy 101 when segmenting a speech signal sample by using the technique represented in FIG. 9F, entropy 102 when using the technique represent in FIG. 9F but applying the length of a frame in a reversed order of time, entropy 103 when randomly segmenting the sample to have a random frame length, and entropy 104 when segmenting the sample to have a 16 ms fixed frame according to a typical technology.

In this case, the graph 103 is the average value of results obtained by performing, an operation of dividing the speech sample with a random frame length and calculating entropy, independently 1000 times.

FIG. 10B is the average value of entropy calculated for pronunciations generated by 48 speakers with respect to a specific syllable. That is, FIG. 10B is the average value of entropy 201 when segmenting according to the technique represented in FIG. 9F, the average value of entropy 202 when using the technique represent in FIG. 9F but applying the length of a frame in a reversed order of time, and the average value of entropy 203 when segmenting with a 15 ms fixed frame according to a typical technology.

Referring to FIGS. 10A and 10B, it is seen that when adopting a method of FIGS. 8 and 9A to 9G according to an embodiment of the present invention, it is possible to obtain greater entropy as compared to other methods.

Figure 11:
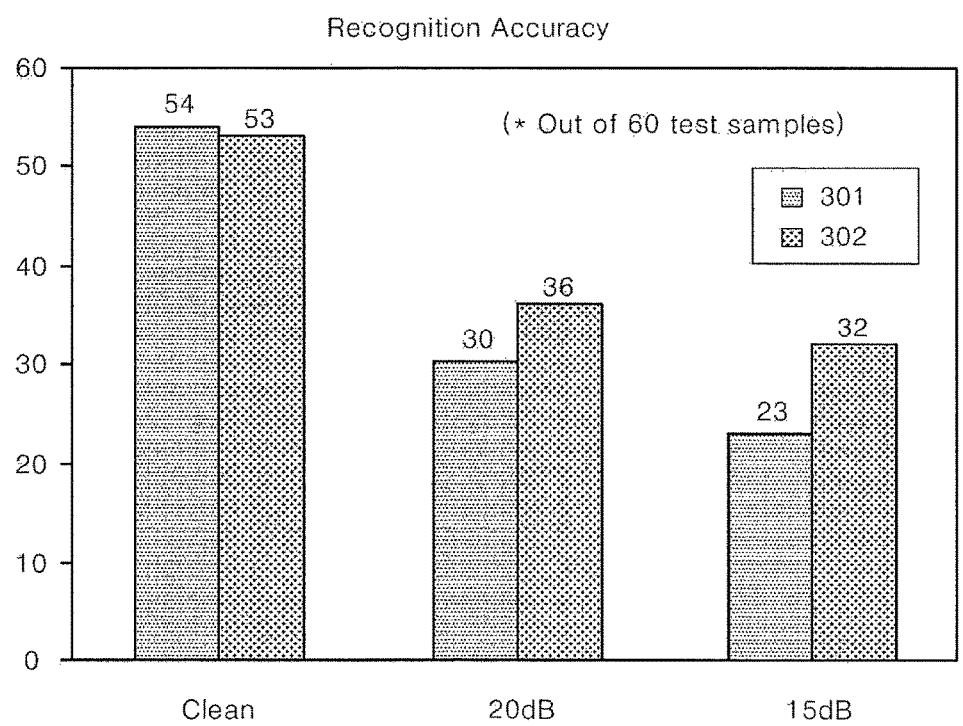
FIG. 11 depicts a result of comparing a speech signal recognizing result using a method of segmenting a speech signal into frames according to an embodiment of the present with a recognizing result according to a typical technology.

FIG. 11 depicts a result of comparing a speech signal recognizing result using a method of segmenting a speech signal into variable frames according to an embodiment of the present invention with a speech signal recognizing result according to a conventional technology.

FIG. 11 is a graph showing a clean speech signal without noise, a 20 dB speech signal with 20 dB noise, and a 15 dB speech signal with 15 dB noise where results recognized by using a frame segmenting method according to an embodiment of the present invention 302 (variable frame) are compared with results recognized by using a method of segmenting with a typical fixed frame length 301 (fixed frame). It may be seen that when using a frame segmenting technology according to an embodiment of the present invention in a noisy environment, a speech recognition result is enhanced.

In a frame segmenting method according to FIG. 8, a first low frequency component is set to a band of 4 Hz to 10 Hz and a second low frequency component is set to a band of 25 Hz to 30 Hz. However, the values of entropy may vary according to particular band values of the first low frequency component and the second low frequency component. The difference of entropy calculated according to a combination of particular bands of the first low frequency component and the second low frequency component is described with reference to FIG. 12.

Figure 12:
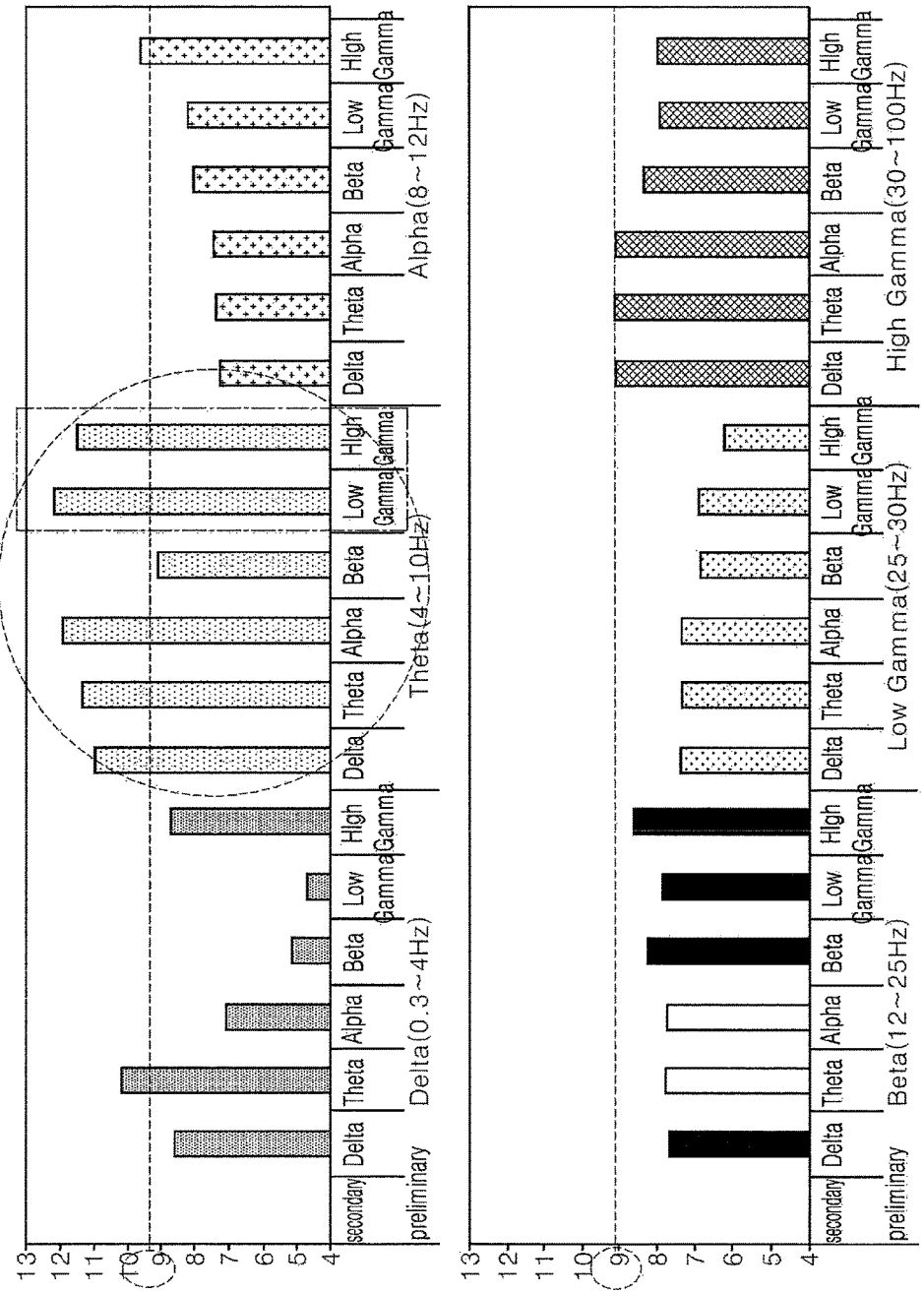
FIG. 12 represents entropy calculated by using various combinations for a band of first low frequency components and a band of second low frequency components.

FIG. 12 represents entropy calculated by using various combinations for a band of first low frequency components and a band of second low frequency components. Each graph in FIG. 12 is a result of experimenting a syllable sample, /pa/. In FIG. 12, the horizontal axis represents combinations of a first low frequency component band and a second low frequency component band and the vertical axis represents entropy calculated for each combination. Also, on the horizontal axis of FIG. 12, a part indexed by 'preliminary' represents a band of first low frequency components in step S83 of FIG. 8, a part indexed by 'secondary' represents a band of second low frequency components in step S86 of FIG. 8. In this case, delta, theta, alpha, beta, low gamma, and mid gamma represents 0.3 Hz to 4 Hz, 4 Hz to 10 Hz, 8 Hz to 12 Hz, 12 Hz to 25 Hz, and 25 Hz to 30 Hz, respectively. Referring to results according to FIG. 12, it may be seen that when the first low frequency component is in the theta band and the second low frequency component is in the low gamma band, the highest entropy value is obtained.

The combination of [a first low frequency component-a second low frequency component] representing especially high entropy in FIG. 12 is [theta-low gamma], [theta-mid gamma], [alpha-low gamma], and [alpha-mid gamma].

Although FIG. 12 shows that [theta-low gamma] has the highest entropy, a combination showing the highest entropy may vary according to a speaker or a speaking speed.

Thus, an embodiment of the present invention may include a step of selecting and using one of N candidate combinations without specifying a combination of [a first low frequency component-a second low frequency component]. That is, when for example, recognizing continuous speech is started, entropy for the N candidate combinations is calculated by using one extracted speech sample and one combination having the highest entropy is selected. Then, by performing a series of steps according to FIG. 8 by using the one combination, it is possible to perform speech recognition on continuous speech. In this example, the N candidate combinations may be, for example, [theta-low gamma], [theta-mid gamma], [alpha-low gamma], and [alpha-mid gamma] that are described above, or may also be set otherwise.

Figure 13:
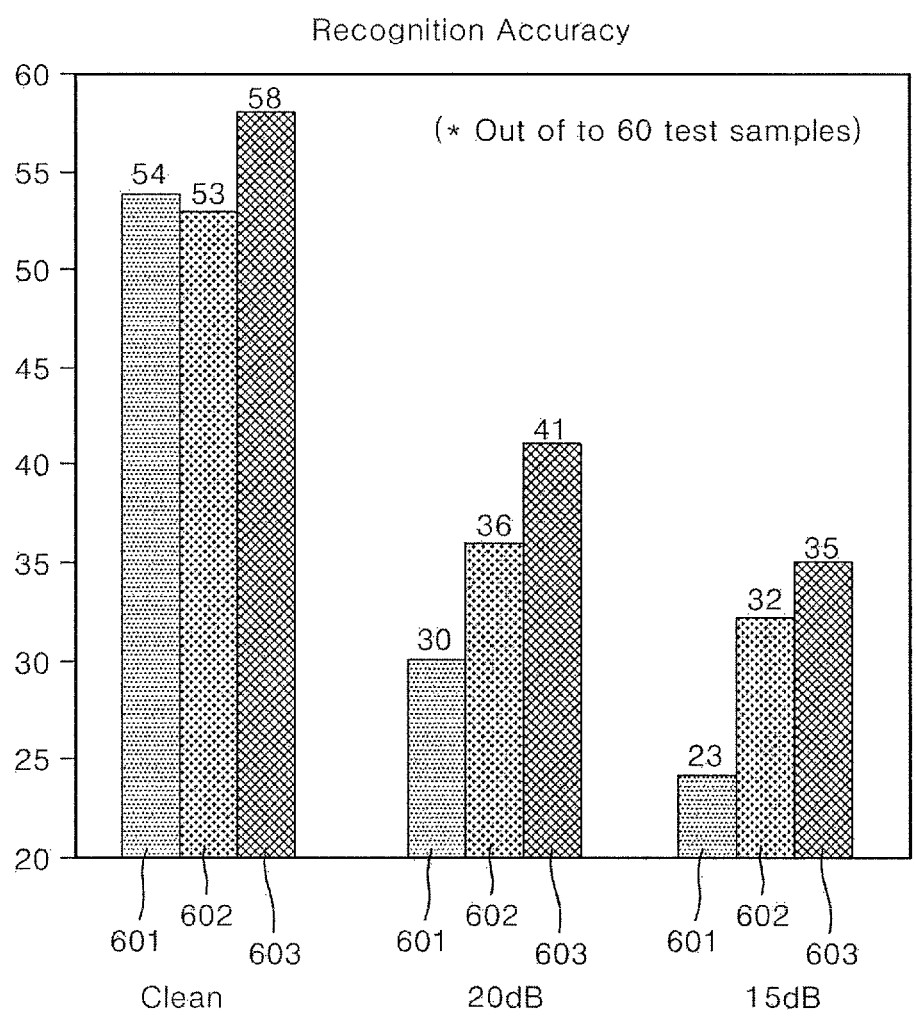
FIG. 13 is graphs for explaining the effect of a method of segmenting a speech signal into frames according to an embodiment of the present invention considering the above-described entropy.

FIG. 13 is graphs for explaining the effect of a variable frame segmenting method according to an embodiment of the present invention considering the above-described entropy.

FIG. 13 represents the accuracy of speech recognition in a first method 601 using a typical fixed frame length, a second method 602 segmenting a frame variably by using a method according to FIG. 8 by using a fixed first frequency component and second frequency component, and a third method 603 dividing a frame variably by using a method according to FIG. 8 by using a combination in which entropy according to frame segmentation becomes maximum, among N combinations of a first low frequency component and a second frequency component. In FIG. 13, the vertical axis represents the accuracy of speech recognition. The experiment is performed on a clean speech signal without noise, a 20 dB speech signal with 20 dB noise, and a 15 dB speech signal with 15 dB noise. Referring to FIG. 13, it may be seen that when the second method and the third method 602 and 603 described above according to embodiments of the present invention are used, higher speech recognition accuracy is represented in a noisy environment as compared to the first method 601 that uses a typical fixed frame. Also, it may be seen that the third method 603 represents higher speech recognition accuracy as compared to the second method 602.

On the other hand, since a typical technology using a fixed-length frame segmenting method may not know on which time-interval phoneme transition occurs, a transition time-interval of a speech signal is found by shifting a 30 ms frame by 10 ms. However, when using a variable frame segmenting method according to an embodiment of the present invention, the speech signal is segmented by using low frequency phase containing information on transition and thus there is no need to shift a frame, for example, by 10 ms as in a typical technology. A decrease in number of frames has an advantage in that in the current speech recognition paradigm transmitting and classifying extracted feature vectors to a server, the load of the entire system decreases. When dividing a frame variably according to an embodiment of the present invention, it is possible to divide a speech signal with frames corresponding to 67% of frames according to a typical technology using a fixed frame length.

FIG. 14 is a table where the number of frames used in a typical technology using a fixed frame length is compared with the number of frames used in an embodiment of the present invention using a variable frame length. In FIG. 14, "fixed segmenting" represents a typical technology using a fixed frame length and "variable segmenting" represents an embodiment of the present invention using a variable frame length. It may be seen that the number of frames according to an embodiment of the present invention with respect to each speech signal is smaller.

According to an embodiment of the present invention represented as an example of FIGS. 8 and 9A to 9E, there is no overlap time-interval between segmented frames but it is also possible to horizontally extend each frame and slightly overlap with each other.

According to the present invention, it is possible to provide a novel speech signal frame segmenting method that may increase speech recognition accuracy.

Also, since the size of a frame varies according to the property of a speech signal, it is possible to more accurately grasp the property of a phoneme (consonant or vowel) and extract information thereon.

By using the above-described embodiments of the present invention, a person skill in the art will be able to easily make various changes and modifications without departing from the essential property of the present invention. Each claim may be combined with any claims that are not dependent thereon, within a scope that may be understood through the specification.

What is claimed is:

1. A method of segmenting a speech signal and extracting speech feature information by using a plurality of speech kernels obtained by modeling a behavior of a basilar membrane for a plurality of central frequencies, the method comprising:
   extracting a first low frequency signal from the speech signal including a consonant with non-periodic property;
   obtaining instantaneous phase information of the first low frequency signal;
   segmenting the speech signal into a plurality of frames with different time lengths, according to a plurality of phase-sections of the obtained instantaneous phase information,
   extracting one or more speech kernel components from one of the segmented frames; and
   extracting the occurrence time and magnitude of each of the extracted one or more speech kernel components as speech feature information of the speech signal.

2. The method of claim 1, wherein a first frame of the plurality of frames is segmented into a plurality of first sub-frames according to the instantaneous phase information of the first low frequency signal extracted from the first frame, and a second frame of the plurality of frames is segmented into a plurality of second sub-frames according to instantaneous phase information of a second low frequency signal extracted from the second frame.

3. The method of claim 2, wherein a frequency band of the first low frequency signal is lower than a frequency band of the second low frequency signal.

4. The method of claim 1, wherein the segmenting comprises segmenting a second frame of the plurality of frames into a plurality of second sub-frames according to instantaneous phase information of a second low frequency signal extracted from the second frame.

5. The method of claim 4, wherein the second frame is a frame that is determined as a consonant component of the speech signal.

6. The method of claim 4, wherein the second frame is a frame whose energy value lies within a predetermined energy range, selected among the plurality of frames.

7. The method of claim 1, wherein the first low frequency signal has a frequency band corresponding to the Theta θ band of a brain signal.

8. The method of claim 3, wherein the first low frequency signal has a frequency band corresponding to the Theta θ band of a brain signal and the second low frequency signal has a band corresponding to the Gamma band of the brain signal.

9. The method of claim 1, wherein the instantaneous phase information ranges from $-\pi$ to $+\pi$.

10. The method of claim 9, wherein the plurality of phase-sections is comprised of a first phase-section from $-\pi$ to $-\pi/2$, a second phase-section from $-\pi/2$ to 0, a third phase-section from 0 to $\pi/2$, and a fourth phase-section from $+\pi/2$ to $+\pi$.

11. The method of claim 1, wherein, the first low frequency signal is extracted from an envelope of the speech signal and a second low frequency signal is extracted from an envelope of a second frame of the plurality of frames.

12. A method of segmenting a speech signal by using a predetermined process and extracting speech feature information by using a plurality of speech kernels obtained by modeling a behavior of a basilar membrane for a plurality of central frequencies, the method comprising:
performing the process on each of $k^{th}$ low frequency signal (k=1 to N) extracted from the speech signal including a consonant with non-periodic property to obtain N sets of entropies; and
performing the process on the $s^{th}$ low frequency signal (s=1, 2, 3, . . . , or N) corresponding to the highest entropy among the N sets of entropies to obtain a plurality of segmented frames of the speech signal
wherein, the predetermined process comprises:
extracting a low frequency signal from the speech signal;
obtaining instantaneous phase information of the low frequency signal;
segmenting the speech signal into a plurality of frames with different time lengths, according to a plurality of phase-sections of the obtained instantaneous phase information,
extracting one or more speech kernel components from one of the segmented frames; and
extracting the occurrence time and magnitude of each of the extracted one or more speech kernel components as speech feature information of the speech signal.

13. A non-transitory computer readable medium storing a program code to enable a processing unit of a computing device to conduct steps of:
extracting a first low frequency signal from a speech signal including a consonant with non-periodic property;
obtaining instantaneous phase information of the first low frequency signal; and
segmenting the speech signal into a plurality of frames with different time lengths, according to a plurality of phase-sections of the obtained instantaneous phase information,
extracting one or more speech kernel components from one of the segmented frames; and
extracting the occurrence time and magnitude of each of the extracted one or more speech kernel components as speech feature information of the speech signal,
wherein, the computing device is configured to extract speech feature information by using a plurality of speech kernels obtained by modeling a behavior of a basilar membrane for a plurality of central frequencies.

14. The non-transitory computer readable medium of claim 13, wherein the program code to enable the processing unit to conduct steps of:
segmenting a first frame of the plurality of frames into a plurality of first sub-frames according to the instantaneous phase information of the first low frequency signal extracted from the first frame and
segmenting a second frame of the plurality of frames into a plurality of second sub-frames according to instantaneous phase information of a second low frequency signal extracted from the second frame.

15. The non-transitory computer readable medium of claim 13, wherein the segmenting of the speech signal comprises segmenting a second frame of the plurality of frames into a plurality of second sub-frames according to instantaneous phase information of a second low frequency signal extracted from the second frame.

16. A computing device comprising a storage unit and a processing unit, wherein the processing unit is configured to conduct steps of:
extracting a first low frequency signal from a speech signal including a consonant with non-periodic property;
obtaining instantaneous phase information of the first low frequency signal; and
segmenting the speech signal into a plurality of frames with different time lengths, according to a plurality of phase-sections of the obtained instantaneous phase information,
wherein,
the computing device is configured to extract speech feature information by using a plurality of speech kernels obtained by modeling a behavior of a basilar membrane for a plurality of central frequencies,
the processing unit is configured to process the speech signal, and
the storage unit stores a program code to enable the processing unit to:
extract one or more speech kernel components from one of the segmented frames; and
extract the occurrence time and magnitude of each of the extracted one or more speech kernel components as speech feature information of the speech signal.

17. The computing device of claim 16, wherein the processing unit is configured to:
segment a first frame of the plurality of frames into a plurality of first sub-frames according to the instantaneous phase information of the first low frequency signal extracted from the first frame and
segment a second frame of the plurality of frames into a plurality of second sub-frames according to instantaneous phase information of a second low frequency signal extracted from the second frame.

18. The computing device of claim 16, wherein the segmenting of the speech signal comprises segmenting a second frame of the plurality of frames into a plurality of second sub-frames according to instantaneous phase information of a second low frequency signal extracted from the second frame.

* * * * *